United States Patent
Ohtani et al.

(10) Patent No.: US 7,927,672 B2
(45) Date of Patent: Apr. 19, 2011

(54) OPTICAL CELLULOSE ACYLATE FILM, POLARIZING PLATE AND LIQUID CRYSTAL DISPLAY

(75) Inventors: Sumio Ohtani, Minami-Ashigara (JP); Hiroyuki Kawanishi, Minami-Ashigara (JP); Seimi Satake, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1146 days.

(21) Appl. No.: 11/630,959

(22) PCT Filed: Jun. 27, 2005

(86) PCT No.: PCT/JP2005/012260
§ 371 (c)(1),
(2), (4) Date: Dec. 28, 2006

(87) PCT Pub. No.: WO2006/001527
PCT Pub. Date: Jan. 5, 2006

(65) Prior Publication Data
US 2008/0062366 A1    Mar. 13, 2008

(30) Foreign Application Priority Data
Jun. 29, 2004 (JP) .................................. 2004-191075

(51) Int. Cl.
*G02F 1/13363* (2006.01)
*G02F 1/335* (2006.01)

(52) U.S. Cl. ......... 428/1.3; 428/1.31; 428/1.33; 349/96; 349/117; 349/118

(58) Field of Classification Search .................. 428/1.3, 428/1.31, 1.33, 1.54; 106/168.01; 349/96, 349/117–118
See application file for complete search history.

(56) References Cited

U.S. PATENT DOCUMENTS

| | | | | |
|---|---|---|---|---|
| 6,818,293 B1 * | 11/2004 | Keep et al. | ..................... | 428/359 |
| 7,099,082 B2 * | 8/2006 | Kawanishi et al. | ............ | 359/499 |
| 7,226,499 B2 * | 6/2007 | Matsufuji et al. | ......... | 106/170.57 |
| 7,586,562 B2 * | 9/2009 | Ito | .................................. | 349/98 |
| 2003/0107807 A1 * | 6/2003 | Saiki et al. | ..................... | 359/485 |

(Continued)

FOREIGN PATENT DOCUMENTS
EP    0 911 656 A2    4/1999
(Continued)

OTHER PUBLICATIONS

JPO Website Machine English Translation of JP 2002-192541, Yamada et al., Jul. 10, 2002.*

(Continued)

*Primary Examiner* — Sophie Hon
(74) *Attorney, Agent, or Firm* — Buchanan Ingersoll & Rooney PC

(57) ABSTRACT

A cellulose acylate film is provided and is excellent in increasability of an in-plane retardation and a retardation in a thickness direction, from which an additive does not bleed out, and which is excellent in surface properties. The cellulose acylate film has a thickness of 40 μm to 180 μm and contains no retardation increasing agent. Retardation values Re and Rth of the cellulose acylate film meet the following formulae (III) to (V):

$$46 \leq Re \leq 100 \quad (III)$$

$$Rth = a - 5.9Re \quad (IV)$$

$$520 \leq a \leq 670 \quad (V)$$

A polarizing plate and a VA mode liquid crystal display having wide viewing angle characteristics and small changes in color, which are using the cellulose acylate film, are provided.

11 Claims, 1 Drawing Sheet

OBSERVER SIDE

VA MODE CELL

LIGHT SOURCE SIDE

U.S. PATENT DOCUMENTS

| | | | |
|---|---|---|---|
| 2003/0180528 A1* | 9/2003 | Flosenzier et al. | 428/327 |
| 2003/0218709 A1* | 11/2003 | Ito et al. | 349/117 |
| 2004/0077752 A1* | 4/2004 | Matsufuji et al. | 524/37 |
| 2004/0212885 A1* | 10/2004 | Mizushima et al. | 359/497 |
| 2008/0062355 A1* | 3/2008 | Sata et al. | 349/96 |

FOREIGN PATENT DOCUMENTS

| | | |
|---|---|---|
| JP | 2587398 B2 | 12/1996 |
| JP | 2002-71957 A | 3/2002 |
| JP | 2002-192541 A | 7/2002 |
| JP | 2003-84271 A | 3/2003 |
| JP | 2003-270442 A | 9/2003 |
| JP | 2003-315551 A | 11/2003 |

OTHER PUBLICATIONS

JPO Website Machine English Translation of JP 2003-315551, Hashimoto et al., Nov. 6, 2003.*

JPO Website Machine English Translation of JP 2002-296422, Yajima Takatoshi, Oct. 9, 2002.*

* cited by examiner

OPTICAL CELLULOSE ACYLATE FILM, POLARIZING PLATE AND LIQUID CRYSTAL DISPLAY

This application is a 371 of PCT/JP05/12260 filed Jun. 27, 2005.

TECHNICAL FIELD

The present invention relates to a cellulose acylate film for optical use, and a polarizing plate and liquid crystal display using the cellulose acylate film.

BACKGROUND ART

Liquid crystal displays have been widely utilized for personal computer use, monitor use of portable devices and television use because of various advantages such as low voltage, low power consumption and possibility of miniaturization and thickness decreasing. In such liquid crystal displays, there have been proposed various modes according to the state of arrangement of liquid crystals in liquid crystal cells. However, a TN mode has hitherto prevailed in which a liquid crystal is twist-orientated through about 90 degrees from a lower substrate of a crystal cell toward an upper substrate thereof.

In general, the liquid crystal display comprises liquid crystal cells, optical compensating sheets and polarizers. The optical compensating sheet is used for eliminating image coloration and for enlarging viewing angles, and a stretched birefringent film or a film in which liquid crystals are applied onto a transparent film has been used. For example, Japanese Patent No. 2587398 discloses a technique for enlarging viewing angles by applying to a liquid crystal cell of the TN mode an optical compensating sheet in which discotic liquid crystals are applied onto a triacetyl cellulose film, orientated and fixed. However, in a liquid crystal display for TV use which is assumed to be viewed from various angles in a large-sized screen, demands towards viewing angle dependency are severe, and the demands have not been satisfied even by the technique as described above. Accordingly, liquid crystal displays of a mode different from the TN mode, such as an IPS (in-plane switching) mode, an OCB (optically compensatory bend) mode or a VA (vertically aligned) mode, have been studied. In particular, attention has been given to the VA mode as the liquid crystal display for TV use, because of its high contrast and relatively high production yield.

A cellulose acylate film is characterized by high optical isotropy (low retardation value), compared to other polymer films. Accordingly, the cellulose acylate film is generally used for use requiring optical isotropy, for example, for a polarizing plate.

On the other hand, optical anisotropy (high retardation value) is conversely required for the optical compensating sheet (retardation film) of the liquid crystal display. In particular, in the optical compensating sheet for VA mode, a retardation (Re) in a film plane of 30 to 200 nm and a retardation (Rth) in a thickness direction of 70 to 400 nm are required. Accordingly, as the optical compensating sheet, there has been generally used a synthetic polymer film having a high retardation value, such as a polycarbonate film or a polysulfone film.

As described above, in the technical fields of optical materials, it has been a general rule that when optical anisotropy (high retardation value) is required for a polymer film, a synthetic film is used, and that when optical isotropy (low retardation value) is required, a cellulose acetate film is used.

EP-A-911656 discloses a cellulose acetate film having a high retardation value which can also be used for use requiring optical isotropy, exploding the conventional general rule. In EP-A-911656, in order to realize a high retardation value in the cellulose acetate film, an aromatic compound having at least two aromatic rings, especially a compound having a 1,3,5-triazine ring, is added, and stretching treatment is performed. In general, it is known that cellulose triacetate is a polymer material difficult to be stretched, so that it is difficult to increase birefringence. However, it is made possible to increase birefringence by concurrently orientating the additive by the stretching treatment, thereby realizing a high retardation value. This film can also serve as a protective layer for a polarizing plate, so that it has the advantage that an inexpensive and thin-thickness liquid crystal display can be provided.

JP-A-2002-71957 discloses an optical film containing a cellulose ester which has acyl groups having 2 to 4 carbon atoms as substituent groups and meets the equation: $2.0 \leq A+B \leq 3.0$ and the equation: $A<2.4$ at the same time, when the degree of substitution of acetyl groups is taken as A, and the degree of substitution of propionyl or butyryl groups is taken as B, wherein the refractive index (Nx) in a slow axis direction and the refractive index (Ny) in a fast axis direction at a wavelength of 590 nm meet the equation: $0.0005 \leq Nx-Ny \leq 0.0050$. JP-A-2002-270442 discloses a polarizing plate used in a VA mode liquid crystal display, wherein the polarizing plate has a polarizer and an optically biaxial mixed fatty acid cellulose ester film, and the optically biaxial mixed fatty acid cellulose ester film is arranged between a liquid crystal cell and the polarizer.

The above-mentioned method is effective in that the inexpensive and thin liquid crystal display is obtained. However, a higher retardation value has recently been required, which makes it necessary to increase the amount of a retardation increasing agent added or to increase the stretch ratio. However, it has become difficult to realize a desired retardation value because of bleeding out of additives or breakage of the film in stretching. Further, the liquid crystal displays are increasingly frequently used under various environments, and the cellulose ester film used in the above-mentioned technique has the problem that the optical compensating function thereof varies under the environments. In particular, there has been the problem that when the cellulose ester film is bonded to the liquid crystal cell, it is influenced by changes in the environment, particularly changes in humidity, to cause changes in Re retardation value and Rth retardation value thereof, resulting in changes in optical compensating ability. It has been desired to solve this problem.

DISCLOSURE OF THE INVENTION

An object of an illustrative, non-limiting embodiment of the invention is to provide a cellulose acylate film which is excellent in increasability of retardations in a film plane and in a thickness direction and from which additives do not bleed out, thereby providing a polarizing plate having no sheet failure. Another object an illustrative, non-limiting embodiment of the invention is to provide a VA mode liquid crystal display having narrow fluctuations in retardation value with environmental humidity and small changes in viewing angle characteristics.

These objects have bee achieved by the following means:

(1) A cellulose acylate film having a thickness of 40 to 180 μm and containing no retardation increasing agent, wherein the cellulose acylate film has a retardation value Re in a film plane thereof and a retardation value Rth in a direction perpendicular to the film plane, the retardation values Re and Rth being defined by formula (I) and (II), respectively, and the retardation values Re and Rth measured at 25° C. and 60% RH satisfy formulae (III) to (V):

$$Re = (nx - ny) \times d \quad \text{(I)}$$

$$Rth = \{(nx + ny)/2nz\} \times d \quad \text{(II)}$$

$$46 \leq Re \leq 100 \quad \text{(III)}$$

$$Rth = a - 5.9 Re \quad \text{(IV)}$$

$$520 \leq a \leq 670 \quad \text{(V)}$$

wherein the retardation values Re and Rth are values by nm at a wavelength of 590 nm, nx is a refractive index in a slow axis direction in the film plane, ny is a refractive index in a fast axis direction in the film plane, nz is a refractive index in the direction perpendicular to the film plane, and d is a thickness by nm of the cellulose acylate film.

(2) The cellulose acylate film as described in the above (1), which comprises a mixed fatty acid ester of cellulose, wherein a hydroxyl group of the cellulose is substituted by an acetyl group, another hydroxyl group of the cellulose is substituted by an acyl group having 3 or more carbon atoms, and the cellulose satisfies formula (IV):

$$2.00 \leq A + B \leq 2.85$$

wherein A is a degree of substitution by the acetyl group, and B is a degree of substitution by the acyl group having 3 or more carbon atoms.

(3) The cellulose acylate film as described in the above (1) or (2), wherein the B is more than 0.6.

(4) The cellulose acylate film as described in any one of the above (1) to (3), which comprises at least one of a plasticizer, an ultraviolet absorber and a release accelerator.

(5) The cellulose acylate film as described in any one of the above (1) to (4), wherein retardation values Re ($\lambda$) and Rth ($\lambda$) measured at 25° C. and 60% RH, which are the retardation values Re and Rth at a wavelength of $\lambda$ nm, respectively, satisfy relations (A) and (B):

$$0.80 \leq Re_{(450)}/Re_{(550)} \leq 1.00 \quad \text{and} \quad 1.00 \leq Re_{(650)}/Re_{(550)} \leq 1.20 \quad \text{(A)}$$

$$0.90 \leq Rth_{(450)}/Rth_{(550)} \leq 1.00 \quad \text{and} \quad 1.00 \leq Rth_{(650)}/Rth_{(550)} \leq 1.10 \quad \text{(B)}$$

(6) A polarizing plate comprising: a polarizer; and a protective film comprising a cellulose acylate film as described in any one of the above (1) to (5).

(7) The polarizing plate as described in the above (6), which satisfies at least one of formulae (a) to (d):

$$40.0 \leq TT \leq 45.0 \quad \text{(a)}$$

$$30.0 \leq PT \leq 40.0 \quad \text{(b)}$$

$$CT \leq 2.0 \quad \text{(c)}$$

$$95.0 \leq P \quad \text{(d)}$$

wherein TT represents a single plate transmittance at 25° C. and 60% RH, PT represents a parallel transmittance at 25° C. and 60% RH, CT represents a cross transmittance at 25° C. and 60% RH, and P represents a polarization degree at 25° C. and 60% RH.

(8) The polarizing plate as described in the above (6) or (7), which satisfies at least one of formulae (e) to (g):

$$T(380) \leq 2.0 \quad \text{(e)}$$

$$T(410) \leq 1.0 \quad \text{(f)}$$

$$T(700) \leq 0.5 \quad \text{(g)}$$

wherein T($\lambda$) represents a cross transmittance at the wavelength of $\lambda$ nm.

(9) The polarizing plate as described in any one of the above (6) to (8), which satisfies at least one of formulae (j) and (k):

$$-6.0 \leq \Delta CT \leq 6.0 \quad \text{(j)}$$

$$-10.0 \leq \Delta P \leq 0.0 \quad \text{(k)}$$

wherein $\Delta CT$ and $\Delta P$ represents a change in cross transmittance and polarization degree, respectively, in a test that the polarizing plate is allowed to stand at 60° C. and 95% RH for 500 hours; and the change means a value calculated by subtracting a measurement value before the test from a measurement value after the test.

(10) The polarizing plate as described in any one of the above (6) to (9), which comprises another protective film comprising at least one layer of a hard coat layer, an anti-glare layer and an anti-reflective layer.

(11) The polarizing plate as described in any one of the above (6) to (10), which is packaged in a moisture-proofed bag, wherein the moisture-proofed bag has an internal humidity of from 43 to 70% RH at 25° C.

(12) The polarizing plate as described in any one of the above (6) to (11), which is packaged in a moisture-proofed bag, wherein the moisture-proofed bag has a first humidity within a range of ±15% RH with respect to a second humidity when the polarizing plate is superposed on a liquid crystal cell at the second humidity.

(13) A liquid crystal display comprising: a liquid crystal cell of VA mode; and at least one of a cellulose acylate film as described in any one of the above (1) to (5) and a polarizing plate as described in any one of the above (6) to (12).

(14) The liquid crystal display as described in the above (13), which contains only one cellulose acylate film as described in any one of the above (1) to (5) or only one polarizing plate as described in any one of the above (6) to (12).

(15) The liquid crystal display as described in the above (13), which further comprising a back light, wherein one of the cellulose acylate film as described in any one of the above (1) to (5) and the polarizing plate as described in any one of the above (6) to (12) is between the liquid crystal cell and the backlight.

An embodiment of a cellulose acylate film of the invention and an embodiment of a polarizing plate using the same are excellent in increasability of a retardation in a film plane and a retardation in a direction perpendicular to the film plane (i.e., a thickness direction), and additives do not bleed out therefrom.

An embodiment of a liquid crystal display of the invention is excellent in viewing angle characteristics, because it has the above-mentioned polarizing plate.

DETAILED DESCRIPTION OF THE INVENTION

Figure 1:
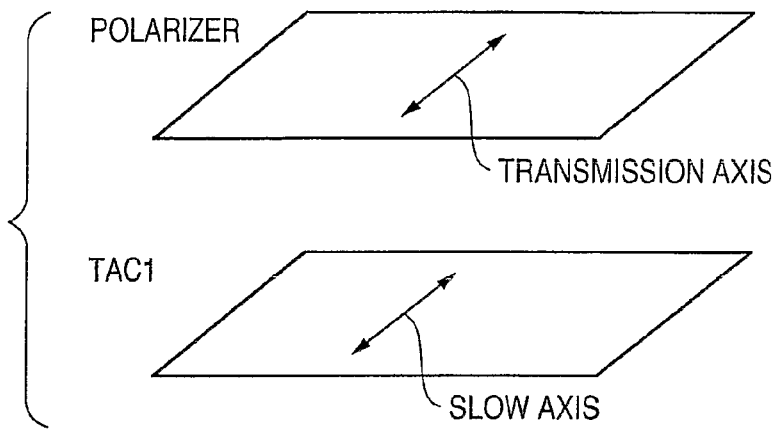
FIG. 1 is a schematic view showing a method for bonding a cellulose acylate film in producing an illustrative, non-limiting embodiment of a polarizing plate of the invention.

An exemplary embodiment of the invention will be described in detail below. In this specification, when a numerical value indicates a physical property value or a characteristic value, the description "(numerical value 1)-(numerical value 2)" or "(numerical value 1) to (numerical value 2)" means the range that falls between the numerical value 1 and the numerical value 2 both inclusive. Further, in this specification, the description "(meth)acrylate" means "at least ether of acrylate and methacrylate". The description "(meth)acrylic acid" is also the same.

(Cellulose Acylates)

The term "retardation increasing agent" as used in the invention means an additive which is an aromatic compound having at least two aromatic rings, for example, a compound having a 1,3,5-triazine ring described in Japanese Patent No. 2587398, and increases a retardation Rth in a thickness direction of the film by 20% or more, or increases a retardation Re in a film plane increased when the film is stretched, by 20% or more, compared to when the retardation increasing agent is not added, by adding the agent to the cellulose acylate in an amount of 0.5% based on the weight thereof. That is "A cellulose acylate film containing no retardation agent" means that a cellulose acylate film contains the agent of not more than 0.5% based on the weight thereof.

Cellulose acylates preferably used in the invention will be described in detail. Each of glucose units which constitute cellulose through β-1,4 bonds has free hydroxyl groups at the 2-, 3-, and 6-positions thereof. The cellulose acylate is a polymer obtained by esterifying a part or the whole of these hydroxyl groups with acyl groups. The acyl substitution degrees (i.e., degrees of hydroxyl groups substituted by acyl groups) DS2, DS3 and DS6 mean the rates of esterification for the hydroxyl groups at the 2-, 3- and 6-positions, respectively (in the case of 100 esterification, the substitution degree is 1). The total acyl substitution degree, that is to say, DS2+DS3+DS6, is preferably from 2.00 to 3.00, more preferably from 2.22 to 2.90, and particularly preferably from 2.40 to 2.82. Further, DS6/(DS2+DS3+DS6) is preferably 0.28 or more, more preferably 0.30 or more, and particularly preferably from 0.30 to 0.34.

As the acetyl group used in the cellulose acylate of the invention, an acetyl group is most typical. When a degree of substitution by the acetyl groups is taken as A, and a degree of substitution by the acyl groups having 3 or more carbon atoms is taken as B, the sum of A and B is preferably from 2.00 to 2.85, more preferably from 2.22 to 2.83, and particularly preferably from 2.40 to 2.80.

Further, when B is 0.6 or more, a solution having desirable solubility can be prepared. In particular, in a non-chlorine-based organic solvent, it becomes possible to prepare a good solution. It further becomes possible to prepare a solution having low viscosity and good filterability. The value of B is preferably 0.8 or more, and particularly preferably from 0.8 to 1.3.

The acyl group having 3 or more carbon atoms of the cellulose acylate used in the invention may be either an aliphatic group or an aryl group, and is not particularly limited. Examples thereof are an alkylcarbonyl ester, alkenylcarbonyl ester, aromatic carbonyl ester and aromatic alkylcarbonyl ester of cellulose, which may each further have a substituted group. Preferred examples of the acyl group having 3 or more carbon atoms include propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cynnamoyl. Of these, preferred are propionyl, butanoyl, dodecanoyl, octadecanoyl, t-butanoyl, oleoyl, benzoyl, naphthylcarbonyl and cynnamoyl, and particularly preferred are propionyl and butanoyl.

(Synthesis Method of Cellulose Acylate)

A basic principle of a synthetic method of the cellulose acylate is described in Migita et al., *Wood Chemistry*, pages 180 to 190 (Kyoritsu Shuppan Co., Ltd., 1968). A typical synthesis method is liquid phase esterification using a carboxylic acid anhydride, acetic acid and a sulfuric acid catalyst. Specifically, a cellulose starting material such as cotton linter or wood pulp is pretreated with an adequate amount of acetic acid, and then put into a previously cooled carboxylation mixture to perform esterification, thereby synthesizing a complete cellulose acylate (the sum of the substitution degrees at 2-, 3- and 6-positions is approximately 3). The above-mentioned carboxylation mixture generally contains acetic acid as a solvent, a carboxylic acid anhydride as an esterifying agent and sulfuric acid as a catalyst. The carboxylic acid anhydride is generally used in a stoichiometric excess of the total of cellulose to be reacted therewith and water existing in the system. After the termination of the acylation reaction, an aqueous solution of a neutralizing agent (for example, a carbonate, acetate or oxide of calcium, magnesium, iron, aluminum or zinc) is added for hydrolysis of excess carboxylic acid anhydride remaining in the system and neutralization of a part of the esterifying catalyst. Then, the resulting complete cellulose acylate is kept at 50 to 90° C. in the presence of a small amount of an acetylation reaction catalyst (generally, remaining sulfuric acid) to conduct saponification and aging, thereby changing the complete cellulose acylate to a cellulose acylate having a desired acyl substitution degree and polymerization degree. At the time when the desired cellulose acylate has been obtained, the catalyst remaining in the system is completely neutralized with the neutralizing agent as described above, or the cellulose acylate solution is put into water or diluted sulfuric acid (or water or diluted sulfuric acid is poured into the cellulose acylate solution) without neutralization to separate the cellulose acylate, followed by washing and stabilization treatment to obtain the cellulose acylate.

In a cellulose acylate film of the invention, it is preferred that the polymer components constituting the film substantially comprise the cellulose acylate defined above. The term "substantially" means 55% by weight or more (preferably 70% by weight or more, and more preferably 80% by weight or more) of the polymer components. As a starting material for film production, there are preferably used cellulose acylate particles. It is preferred that 90% by weight or more of the particles used have a particle size of 0.5 to 5 mm. Further, it is preferred that 50% by weight or more of the particles used have a particle size of 1 to 4 mm. The cellulose acylate particles preferably have a shape as similar to a sphere as possible.

The viscosity average polymerization degree of a cellulose acylate used in the invention is from 200 to 700, preferably from 250 to 550, more preferably from 250 to 400, and particularly preferably from 250 to 350. The average polymerization degree can be measured by a limiting viscosity method of Uda et al., (Kazuo Uda and Hideo Saito, Seni-Gakkai Shi (The Journal of the Society of Fiber Science and Technology, Japan) 18 (1), 105-120, 1962). It is further described in detail in JP-A-9-95538.

When low molecular weight components are removed from the cellulose acylate, the average molecular weight (polymerization degree) thereof becomes high. However, the viscosity thereof becomes lower than that of the ordinary cellulose acylate, so that the removal of the low molecular weight components is useful. The cellulose acylate containing the low molecular weight components in small amounts can be obtained by removing the low molecular weight components from a cellulose acylate synthesized by an ordinary method. The removal of the low molecular weight components can be carried out by washing the cellulose acylate with an appropriate organic solvent. When the cellulose acylate containing the low molecular weight components in small amounts is produced, the amount of the sulfuric acid catalyst in the acylation reaction is preferably adjusted to 0.5 to 25 parts by weight based on 100 parts by weight of cellulose. The cellulose acylate which is also preferred in terms of molecular weight distribution (uniform in molecular weight distribution) can be synthesized by adjusting the amount of the sulfuric acid catalyst within the above-mentioned range. When used in the production of a cellulose, acylate film of the invention, the cellulose acylate has preferably a water content of 2% by weight or less, more preferably a water content of 1% by weight or less, and particularly preferably a water content of 0.7% by weight or less. In general, the cellulose acylate contains water, and the water content thereof is known to be from 2.5 to 5% by weight. In order to adjust the cellulose acylate to this water content in the invention, drying is required, and a method therefor is not particularly limited, as long as the desired water content is attained.

Starting material cotton and synthesis methods of these cellulose acylates used in the invention are described in JIII Journal of Technical Disclosure No. 2001-1745, pages 7 to 12 (published on May 15, 2001, Japan Institute of Invention and Innovation) in detail.

(Additives)

Various additives (for example, a plasticizer, an ultraviolet absorber, a deterioration inhibitor, fine particles, a release accelerator and an infrared absorber) can be added to the cellulose acylate solution in the invention in each preparation step depending on its use, and may be either solids or oily products. That is to say, there is no particular limitation on their melting point and boiling point. For example, an ultraviolet absorber having a melting point of 20° C. or lower and that having a melting point of higher than 20° C. may be mixed with each other, or plasticizers may be similarly mixed, which is described, for example, in JP-A-2001-151901. Examples of the releasing agents include ethyl esters of citric acid. Further, infrared absorbing dyes are described, for example, in JP-A-2001-194522. The addition may be performed at any time of the dope-producing process, and a step for adding the additives may be added as a final step of the dope-producing process. Furthermore, there is no particular limitation on the amount of each material added, as long as its function is exhibited. When the cellulose acylate film is formed in multiple layers, the kinds of additives and amounts thereof added in the respective layers may be different. This is described, for example, in JP-A-2001-151902, and is a technique which has hitherto been known. It is preferred to adjust the glass transition temperature (Tg) of the cellulose acylate film to 70 to 145° C. and the elastic modulus measured with a tensile tester to 1,500 to 3,000 MPa by selecting the kinds of these additives and amounts thereof added.

Further, there are preferably used materials described in JIII Journal of Technical Disclosure No. 2001-1745, from page 16 on (published on May 15, 2001, Japan Institute of Invention and Innovation) in detail.

Organic solvents in which the cellulose acylate is dissolved will be described in detail below.

(Chlorine-Based Solvents)

In a preparation of the cellulose acylate solution in the invention, a chlorine-based organic solvent is preferably used as a main solvent. In the invention, the kind of chlorine-based organic solvent is not particularly limited, as long as its object can be attained within the range where the cellulose acylate can be dissolved to perform flow casting or film formation. These chlorine-based organic solvents are preferably dichloromethane and chloroform, and dichloromethane is particularly preferred. Further, there is no particular limitation on mixing with an organic solvent other than the chlorine-based organic solvent. In that case, it is necessary to use dichloromethane in an amount of at least 50% by weight. The non-chlorine-based organic solvent used in combination with the chlorine-based organic solvent will be described below. That is to say, the non-chlorine-based organic solvent is a solvent selected from an ester, ketone, ether and hydrocarbon, each of which has 3 to 12 carbon atoms. The ester, ketone, ether and hydrocarbon may have a cyclic structure. A compound having any two or more of ester, ketone and ether functional groups (that is to say, —O—, —CO— and —COO—) is also usable as a solvent. For example, the solvent may have another functional group such as an alcoholic hydroxyl group at the same time. In the case of the solvent having two or more kinds of functional groups, the number of carbon atoms of the solvent may be within the specified range for a compound having any one of the functional groups. Examples of the esters having 3 to 12 carbon atoms include ethyl formate, propyl formate, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methylcyclohexane. Examples of the ethers having 3 to 12 carbon atoms include diisopropyl ether, dimethoxymethane, dimethoxyethane, 1,4-dioxane, 1,3-dioxolane, tetrahydrofuran, anisole and phenetole. Examples of the organic solvents having two or more kinds of functional groups include 2-ethoxyethyl acetate, 2-methoxyethanol and 2-butoxyethanol.

The alcohol used in combination with the chlorine-based organic solvent may be preferably straight-chain, branched or cyclic, and preferably a saturated aliphatic hydrocarbon among others. The hydroxyl group of the alcohol may be any of the primary to tertiary ones. Examples of the alcohols include methanol, ethanol, 1-propanol, 2-propanol, 1-butanol, 2-butanol, t-butanol, 1-pentanol, 2-methyl-2-butanol and cyclohexanol. As the alcohol, there is also usable a fluorine-based alcohol. Examples thereof include 2-fluoroethanol, 2,2,2-trifluoroethanol and 2,2,3,3-tetra-fluoro-1-propanol. Further, the hydrocarbon may be straight-chain, branched or cyclic. Either an aromatic hydrocarbon or an aliphatic hydrocarbon can be used. The aliphatic hydrocarbon may be saturated or unsaturated. Examples of the hydrocarbons include cyclohexane, hexane, benzene, toluene and xylene.

Combinations of the chlorine-based organic solvents preferably used as main solvents in the invention include but are not limited to the following:

Dichloromethane/methanol/ethanol/butanol (80/10/5/5, parts by weight),

Dichloromethane/acetone/methanol/propanol (80/10/5/5, parts by weight),

Dichloromethane/methanol/butanol/cyclohexane (80/10/5/5, parts by weight),

Dichloromethane/methyl ethyl ketone/methanol/butanol (80/10/5/5, parts by weight), Dichloromethane/acetone/methyl ethyl ketone/ethanol/isopropanol (75/8/5/5/7, parts by weight), Dichloromethane/cyclopentanone/methanol/isopropanol (80/7/5/8, parts by weight), Dichloromethane/methyl acetate/butanol (80/10/10, parts by weight), Dichloromethane/cyclohexanone/methanol/hexane (70/20/5/5, parts, by weight), Dichloromethane/methyl ethyl ketone/acetone/methanol/ethanol (50/20/20/5/5, parts by weight), Dichloromethane/1,3-dioxolane/methanol/ethanol (70/20/5/5, parts by weight), Dichloromethane/dioxane/acetone/methanol/ethanol (60/20/10/5/5, parts by weight), Dichloromethane/acetone/cyclopentanone/ethanol/isobutanol/cyclohexane (65/10/10/5/5/5, parts by weight), Dichloromethane/methyl ethyl ketone/acetone/methanol/ethanol (70/10/10/5/5, parts by weight), Dichloromethane/acetone/ethyl/acetate/ethanol/butanol/hexane (65/10/10/5/5/5, parts by weight), Dichloromethane/methyl acetoacetate/methanol/ethanol (65/20/10/5, parts by weight), and Dichloromethane/cyclopentanone/ethanol/butanol (65/20/10/5, parts by weight).

(Non-Chlorine-Based Solvents)

Then, non-chlorine-based organic solvents preferably used in the preparation of the cellulose acylate solution in the invention will be described below. In the invention, the non-chlorine-based organic solvent is not particularly limited, as long as its object can be attained within the range where the cellulose acylate can be dissolved to perform flow casting or film formation. The non-chlorine-based organic solvent is preferably a solvent selected from an ester, ketone and ether, each of which has 3 to 12 carbon atoms. The ester, ketone, ether and hydrocarbon may have a cyclic structure. A compound having any two or more of ester, ketone and ether functional groups (that is to say, —O—, —CO— and —COO—) is also usable as a main solvent. For example, the solvent may have another functional group such as an alcoholic hydroxyl group. In the case of the solvent having two or more kinds of functional groups, the number of carbon atoms of the solvent may be within the specified range for a compound having any one of the functional groups. Examples of the esters having 3 to 12 carbon atoms include ethyl formate, propyl formate, pentyl formate, methyl acetate, ethyl acetate and pentyl acetate. Examples of the ketones having 3 to 12 carbon atoms include acetone, methyl ethyl ketone, diethyl ketone, diisobutyl ketone, cyclopentanone, cyclohexanone and methylcyclohexane. Examples of the ethers having 3 to 12 carbon atoms include diisopropyl ether, dimethoxymethane, dimethoxyethane, 1,4-dioxane, 1,3-dioxolane, tetrahydrofuran, anisole and phenetole. Examples of the organic solvents having two or more kinds of functional groups include 2-ethoxyethyl acetate, 2-methoxyethanol and 2-butoxyethanol.

The non-chlorine-based solvent used for the above-mentioned cellulose acylate is selected from the various viewpoints as described above, but is preferably as follows. That is to say, the preferred solvent for the cellulose acylate used in the invention is a mixed solvent containing three or more kinds of solvents different from one another. The first solvent is at least one selected from methyl acetate, ethyl acetate, methyl formate, ethyl formate, acetone, dioxolane and dioxane, or a mixed solution thereof. The second solvent is selected from a ketone having 4 to 7 carbon atoms and an acetoacetic acid ester. The third solvent is selected from an alcohol or a hydrocarbon, each of which has 1 to 10 carbon atoms, and is preferably an alcohol having 1 to 8 carbon atoms. When the first solvent is a mixed solution of two or more solvents, the second solvent may not be used. The first solvent is more preferably methyl acetate, acetone, methyl formate, ethyl formate or a mixture thereof, and the second solvent is preferably methyl ethyl ketone, cyclopentanone, cyclohexanone, methyl acetylacetate or a mixed liquid thereof.

The alcohol, the third solvent, may be straight-chain, branched or cyclic, and preferably a saturated aliphatic hydrocarbon among others. The hydroxyl group of the alcohol may be any of the primary to tertiary ones. Examples of the alcohols include methanol, ethanol, 1-propanol, 2-propanol, 1-butanol, 2-butanol, t-butanol, 1-pentanol, 2-methyl-2-butanol and cyclohexanol. As the alcohol, there is also usable a fluorine-based alcohol. Examples thereof include 2-fluoroethanol, 2,2,2-trifluoroethanol and 2,2,3,3-tetrafluoro-1-propanol. Further, the hydrocarbon may be straight-chain, branched or cyclic. Either an aromatic hydrocarbon or an aliphatic hydrocarbon can be used. The aliphatic hydrocarbon may be saturated or unsaturated. Examples of the hydrocarbons include cyclohexane, hexane, benzene, toluene and xylene. These alcohols and hydrocarbons, the third solvents, may be used either alone or as a mixture of two or more thereof, and are not particularly limited thereby. Preferred specific examples of the third solvents include alcohols such as methanol, ethanol, 1-propanol, 2-propanol, 1-butanol, 2-butanol and cyclohexanol; and hydrocarbons such as cyclohexane and hexane. In particular, preferred are methanol, ethanol, 1-propanol, 2-propanol and 1-butanol.

It is preferred that the mixed solvent containing the above-mentioned three kinds of solvents contains the first solvent in an amount of 20 to 95% by weight, the second solvent in an amount of 2 to 60% by weight and the third solvent in an amount of 2 to 30% by weight. More preferably, the mixed solvent contains the first solvent in an amount of 30 to 90% by weight, the second solvent in an amount of 3 to 50% by weight and the alcohol or the third solvent in an amount of 3 to 25% by weight. It is particularly preferred that the mixed solvent contains the first solvent in an amount of 30 to 90% by weight, the second solvent in an amount of 3 to 30% by weight and the alcohol or the third solvent in an amount of 3 to 15% by weight. When the first solvent is a mixed solution and the second solvent is not used, it is preferred that the mixed solvent contains the first solvent in an amount of 20 to 90% by weight and the third solvent in an amount of 5 to 30% by weight. More preferably, the mixed solvent contains the first solvent in an amount of 30 to 86% by weight and the third solvent in an amount of 7 to 25% by weight. The above-mentioned non-chlorine-based organic solvents used in the invention are described in JIII Journal of Technical Disclosure No. 2001-1745, pages 12 to 16 (published on May 15, 2001, Japan Institute of Invention and Innovation) in more detail. Preferred combinations of the non-chlorine-based organic solvents used in the invention include but are not limited to the following:

Methyl acetate/acetone/methanol/ethanol/butanol (75/10/5/5/5, parts by weight),

Methyl acetate/acetone/methanol/ethanol/propanol (75/10/5/5/5, parts by weight), Methyl acetate/acetone/methanol/butanol/cyclohexane (75/10/5/5/5, parts by weight), Methyl acetate/acetone/ethanol/butanol (81/8/7/4, parts by weight), Methyl acetate/acetone/ethanol/butanol (82/10/4/4, parts by weight), Methyl acetate/acetone/ethanol/butanol (80/10/4/6, parts by weight), Methyl acetate/methyl ethyl ketone/methanol/butanol (80/10/5/5, parts by weight), Methyl acetate/acetone/methyl ethyl ketone/ethanol/isopropanol (75/8/5/5/7, parts by weight), Methyl acetate/cyclopentanone/methanol/isopropanol (80/7/5/8, parts by weight), Methyl acetate/acetone/butanol (85/10/5, parts by weight), Methyl acetate/cyclopentanone/acetone/methanol/butanol (60/15/14/5/6, parts by weight), Methyl acetate/cyclohexanone/methanol/hexane (70/20/5/5, parts by weight), Methyl acetate/methyl ethyl ketone/acetone/methanol/ethanol (50/20/20/5/5, parts by weight), Methyl acetate/1,3-dioxolane/methanol/ethanol (70/20/5/5, parts by weight), Methyl acetate/dioxane/acetone/methanol/ethanol (60/20/10/5/5, parts by weight), Methyl acetate/acetone/cyclopentanone/ethanol/isobutanol/cyclohexane (65/10/10/5/5/5, parts by weight), Methyl formate/methyl ethyl ketone/acetone/methanol/ethanol (50/20/20/5/5, parts by weight), Methyl formate/acetone/ethyl acetate/ethanol/butanol/hexane (65/10/10/5/5/5, parts by weight), Acetone/methyl acetoacetate/methanol/ethanol (65/20/10/5, parts by weight), Acetone/cyclopentanone/ethanol/butanol (65/20/10/5, parts by weight), Acetone/1,3-dioxolane/ethanol/butanol (65/20/10/5, parts by weight), and 1,3-Dioxolane/cyclohexanone/methyl ethyl ketone/methanol/butanol (55/20/10/5/5/5, parts by weight).

Further, there can also be used cellulose acylate solutions prepared by the following methods:

A cellulose acylate solution is prepared with methyl acetate/acetone/ethanol/butanol (81/8/7/4, parts by weight), filtered and concentrated, followed by further addition of 2 parts by weight of butanol;

A cellulose acylate solution is prepared with methyl acetate/acetone/ethanol/butanol (84/10/4/2, parts by weight), filtered and concentrated, followed by further addition of 4 parts by weight of butanol; and A cellulose acylate solution is prepared with methyl acetate/acetone/ethanol (84/10/6, parts by weight), filtered and concentrated, followed by further addition of 5 parts by weight of butanol.

(Characteristics of Cellulose Acylate Solutions)

The cellulose acylate solution used in the invention is characterized in that the cellulose acylate is dissolved in the organic solvent in an amount of 10 to 30% by weight, more preferably in an amount of 13 to 27% by weight, and particularly preferably in an amount of 15 to 25% by weight. As a method for adjusting the cellulose acylate solution to these concentrations, the solution may be adjusted to a specified concentration at a dissolution stage, or may be previously prepared as a low-concentrated solution (for example, 9 to 14% by weight), followed by adjustment to a specified high-concentrated solution at a concentration stage described later. Further, a high-concentrated cellulose acylate solution is previously prepared, and then various additives are added thereto, thereby preparing a specified low-concentrated cellulose acylate solution. Even when any of the methods is used, there is no particular problem, as long as the concentration of the cellulose acylate solution of the invention is obtained.

In the invention, the association molecular weight of the cellulose acylate in a solution obtained by diluting the cellulose acylate solution with an organic solvent having the same composition as the solution to a concentration of 0.1 to 5% by weight is preferably from 150,000 to 15,000,000. More preferably, the association molecular weight thereof is from 180,000 to 9,000,000. The association molecular weight can be determined by the static light-scattering method. The cellulose acylate is dissolved so that the square radius of inertia determined concurrently at that time becomes preferably 10 to 200 nm, and more preferably 20 to 200 nm. Furthermore, the cellulose acylate is dissolved so that the second virial coefficient becomes preferably $-2\times10^{-4}$ to $4\times10^{-4}$, and more preferably $-2\times10^{-4}$ to $2\times10^{-4}$. The definitions of the association molecular weight, the square radius of inertia and the second virial coefficient as used in the invention will be described. Theses were measured by the static light-scattering method according to the following process. The measurement was made in a dilute region as a matter of convenience of a measuring device. However, these measured values reflect the behavior of a dope of the invention in a region of high concentration. First, the cellulose acylate was dissolved in the solvent used for the dope to prepare a 0.1 weight %, 0.2 weight %, 0.3 weight % and 0.4 weight % solutions. In order to prevent moisture absorption, the cellulose acylate was previously dried at 120° C. for 2 hours, and then weighed at 25° C. and 10% RH. Dissolution was performed according to a method employed in dope dissolution (an ordinary dissolution method, a cooling dissolution method or a high-temperature dissolution method). Subsequently, these solutions and the solvent were filtered through a 0.2-μm Teflon filter. The static light scattering of the filtered solution was measured at 25° C. at intervals of 10 degrees from 30 degrees to 140 degrees by using a light-scattering measuring device (DLS-700, manufactured by Otsuka Electronics Co., Ltd.). The resulting data were analyzed according to the Berry plotting method. As the refractive index necessary for this analysis, the value of the solvent determined with an Abbe's refractometer was used, and the concentration gradient thereof (dn/dc) was measured with a differential refractometer (DRM-1021, Otsuka Electronics Co., Ltd.) using the solvent and solutions used for the light scattering measurement.

(Dope Preparation)

In the preparation of the cellulose acylate solution (dope) of the invention, there is no particular restriction on the dissolution method thereof. The dope may be prepared at room temperature, or by the cooling dissolution method, the high-temperature dissolution method or a combination thereof. With respect to these, methods for preparing a cellulose acylate solution are described, for example, in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-4-259511, JP-A-2000-273184, JP-A-

11-323017 and JP-A-11-302388. The above-mentioned methods of dissolving a cellulose acylate in an organic solvent can be properly applied also in the invention, as long as they are within the scope of the invention. Details of these, particularly the non-chlorine-based solvent system, are described in JIII Journal of Technical Disclosure No. 2001-1745, pages 22 to 25 (published on May 15, 2001, Japan Institute of Invention and Innovation). Further, the cellulose acylate dope solution used in the invention is usually concentrated and filtered, and details thereof are also described in JIII Journal of Technical Disclosure No. 2001-1745, page 25 (published on May 15, 2001, Japan Institute of Invention and Innovation). When dissolved at high temperature, the cellulose acylate is almost always dissolved at a temperature equal to or higher than the boiling point of the organic solvent used. In that case, it is dissolved under pressure.

In the cellulose acylate solution used in the invention, the viscosity and dynamic storage elastic modulus of the solution are preferably within certain ranges. One milliliter of a sample solution was measured by using a rheometer (CLS 500) with a steel cone having a diameter of 4 cm/2° (both manufactured by TA Instruments Inc.). The static non-Newtonian viscosity at 40 C.° (n*; unit: Pa·s) and the storage elastic modulus at −5° C. (G'; unit: Pa) were determined by measuring under the conditions of 2° C./min within the range of from 40° C. to −10° C. in Oscillation Step/Temperature Ramp. The temperature of the sample solution was previously kept at a measurement initiating temperature until the solution temperature became constant, and then the measurement was initiated. In the invention, the viscosity at 40° C. is preferably from 1 to 400 Pa·s, and the dynamic storage elastic modulus at 15° C. is preferably 500 Pa or more. More preferably, the viscosity at 40° C. is from 10 to 200 Pa·s, and the dynamic storage elastic modulus at 15° C. is from 100 to 1,000,000 Pa. Furthermore, the higher dynamic storage elastic modulus at low temperature is preferred. For example, when the temperature of a flow-casting support is −5° C., the dynamic storage elastic modulus at −5° C. is preferably from 10,000 to 1,000,000 Pa, and when the temperature of the support is −50° C., the dynamic storage elastic modulus at −50° C. is preferably from 10,000 to 5,000,000 Pa.

As described above, the cellulose acylate solution is characterized in that it is obtained as a high-concentrated dope, and the cellulose acylate solution having a high concentration and excellent stability is obtained without relying on a means of concentration. In order to make dissolution further easier, the cellulose acylate may be dissolved at a low concentration, and then the resulting solution may be concentrated by using concentration means. Although there is no particular limitation on the method for concentration, there is used, for example, a method of obtaining a high-concentrated solution with evaporation of a solvent that comprises the steps of introducing a low-concentrated solution between a cylinder and a rotating locus formed by the outer periphery of a blade rotating in the peripheral direction inside the cylinder, and applying a difference in temperature between the cylinder and the solution (for example, JP-A-4-259511); or a method of blowing a heated low-concentrated solution from a nozzle into a chamber, conducting flash evaporation of the solvent until the solution from the nozzle strikes upon an inner wall of the chamber, removing solvent vapor from the chamber at the same time, and taking out a high-concentrated solution (for example, methods described in U.S. Pat. Nos. 2,541,012, 2,858,229, 4,414,341 and 4,504,355).

Prior to flow casting, it is preferred to eliminate from the solution, unsolved matter and foreign matter such as dust and impurities by filtration through an appropriate filter medium such as metal gauze (wire mesh) or flannel. For filtration of the cellulose acylate solution, a filter having an absolute filtration accuracy of 0.1 to 100 μm is used, and a filter having an absolute filtration accuracy of 0.5 to 25 μm is preferably used. The thickness of the filter is preferably within the range of 0.1 to 10 mm, and more preferably within the range of 0.2 to 2 mm. In that case, filtration is preferably performed at a filtration pressure of 16 kgf/cm$^2$ or less, more preferably 12 kgf/cm$^2$ or less, still more preferably 10 kgf/cm$^2$ or less, and particularly preferably 2 kgf/cm$^2$ or less. As the filter media, there are used conventionally known materials such as glass fiber, cellulose fiber, filter paper and a fluororesin such as a tetrafluoroethylene resin. In particular, ceramics and metals are preferably used. The viscosity of the cellulose acylate solution just before the film formation may be any, as long as it is within the range in which flow casting is possible at the time of film formation. Generally, the cellulose acylate solution is prepared so as to have a viscosity preferably within the range of 10 Pa·s to 2,000 Pa·s, more preferably within the range of 30 Pa·s to 1,000 Pa·s, and still more preferably within the range of 40 Pa·s to 500 Pa·s. The temperature at this time is not particularly limited, as long as the temperature is that at the time of flow casting. However, it is preferably from −5 to 70° C., and more preferably from −5 to 55° C.

(Film Formation)

A method for producing the film using the cellulose acylate solution will be described below. As the method and apparatus for producing a cellulose acylate film of the invention, there are used a solution-casting film-forming method and a solution-casting film-forming apparatus which are conventionally subjected to the production of cellulose triacetate films. A dope (a cellulose acylate solution) prepared in a dissolving device (pot) is once stored in a storing pot, and bubbles contained in the dope are removed to conduct final adjustment. From a dope exhaust, the dope is fed to a pressurized die, for example, through a pressurized metering gear pump capable of quantitatively feeding liquid with high precision by controlling the number of rotations thereof. The dope is homogeneously cast from a cap (slit) of the pressurized die onto a metal support of a flow-casting unit that is running endlessly, and a half-dried dope film (also referred to as a web) is peeled from the metal support at a peeling point at which the metal support has circulated approximately once around. Both ends of the resulting web were pinched with clips, and the web is transported with a tenter while keeping the width of the web and dried. Subsequently, the web is transported with a group of rolls of a drying machine to complete drying, and taken up on a winder to a prescribed length. A combination of a tenter and a drying machine equipped with a group of rolls may vary depending upon its purpose. In the solution-casting film-forming method used for the production of films for electronic displays, not only a solution-casting film-forming apparatus, but also a coater is often added for surface treatment of the films, to which layers such as a subbing layer, an antistatic layer, an antihalation layer and a protective layer are provided. Respective production processes will be described in brief below, but the invention is not limited thereto.

First, when the cellulose acylate film is prepared by a solvent-cast method, the cellulose acylate solution (dope) prepared is cast over a drum or a band, and a solvent is evaporated therefrom, thereby forming a film. It is preferred to adjust the concentration of the dope before flow casting so as to give a solid content of 5 to 40% by weight. The surface of the drum or band is preferably finished to a mirror-smooth state. The dope is preferably cast over the drum or band having a surface temperature of 30° C. or lower. In particular, the metal support temperature is preferably from −10 to 20° C. Further, in the invention, there can be applied techniques described in JP-A-2000-301555, JP-A-2000-301558, JP-A-07-032391, JP-A-03-193316, JP-A-05-086212, JP-A-62-037113, JP-A-02-276607, JP-A-55-014201, JP-A-02-111511 and JP-A-02-208650.

(Multilayer Flow Casting)

The cellulose acylate solution may be cast as a single layer over the smooth band or drum that acts as the metal support, or a plurality of cellulose acylate solutions may be cast as two or more layers. When the plurality of cellulose acylate solutions are cast, a film may be prepared while successively casting the cellulose acylate-containing solutions from their respective plural casting dies disposed at intervals in the direction of progress of the metal support and laminating them. For example, methods described in JP-A-61-158414, JP-A-1-122419 and JP-A-11-198285 can be adapted. Further, the film may be formed by casting the cellulose acylate solutions from two casting dies, and this can be performed by methods described for example, in JP-B-60-27562, JP-A-61-94724, JP-A-61-947245, JP-A-61-104813, JP-A-61-158413 and JP-A-6-134933. Furthermore, there may be used a cellulose acylate film casting method described in JP-A-56-162617, in which a flow of a high-viscosity cellulose acylate solution is enveloped in a low-viscosity cellulose acylate solution and both of the high and low-viscosity cellulose acylate solutions are extruded simultaneously. In addition, it is also preferred embodiment to allow an alcohol component which is a poor solvent to be contained in an outer solution in an amount larger than in an inner solution, as described in JP-A-61-94724 and JP-A-61-94725. Alternatively, using two casting dies, a film formed on a metal support from the first casting die is peeled, and the second casting may be conducted on the side of the film contacted with the metal support surface, thereby preparing a film. This method is described, for example, in JP-B-44-20235. The cellulose acylate solutions to be caste may be the same or different, and they are not particularly limited. In order to give functions to the plurality of cellulose acylate layers, cellulose acylate solutions corresponding to the respective functions may be extruded from different casting dies respectively. Further, the cellulose acylate solution can also be cast simultaneously together with other functional layers (for example, an adhesive layer, a dye layer, an antistatic layer, an antihalation layer, a UV absorbing layer and a polarizing layer).

In one type of single layer solution, it is necessary to extrude the cellulose acylate solution having a high concentration and a high viscosity, in order to obtain a desired film thickness. In that case, stability of the cellulose acylate solution is poor, so that solid matter is generated to induce spot troubles and inferior flatness, which causes a problem in many cases. As a measure to solve this problem, a plurality of cellulose acylate solutions are cast from casting dies, thereby being able to extrude high viscosity solutions on a metal support at the same time. Not only a film also improved in flatness and having excellent face quality can be prepared, but also a reduction in drying load can be achieved by use of the concentrated cellulose acylate solution to enhance the production rate of the film.

In the case of co-casting, the thickness of the inside layer and the outside layer is not particularly limited. However, the thickness of the outside layer is preferably from 1 to 50%, and more preferably from 2 to 30%, of the entire film thickness. In the case of co-casting of at least three layers, the total film thickness of the layer in contact with the metal support and the layer in contact with air is defined as the film thickness of the outside. In the case of co-casting, it is also possible to co-cast cellulose acylate solutions different in concentration of the above-mentioned additive such as the plasticizer, the UV absorbing agent or the matting agent, thereby preparing a cellulose acylate film having a laminated structure. For example, a cellulose acylate film having a constitution of a skin layer/a core layer/a skin layer can be prepared. For example, the matting agent can be added to the skin layer in an amount larger than to the core layer, or only to the skin layer. The plasticizer and an UV absorber can be added to the core layer in an amount larger than to the skin layer, or only to the core layer. Further, the kinds of plasticizer and UV absorber can also be changed between the core layer and the skin layer. For example, it is possible to add the low volatile plasticizer and/or UV absorber to the skin layer and the plasticizer excellent in plasticity or the UV absorber excellent in UV absorption to the core layer. Further, it is also a preferred embodiment that a releasing agent is added only to the skin layer on the metal support side. Furthermore, in order to allow the solution to gel by cooling the metal support by a cooling drum method, it is also preferred to add an alcohol as a poor solvent to the skin layer in an amount larger than to the core layer. Tg may be different between the skin layer and the core layer, and Tg of the core layer is preferably lower than that of the skin layer. In addition, the viscosity of a solution containing the cellulose acylate at the time of casting may be different between the skin layer and the core layer. The viscosity of the skin layer is preferably lower than that of the core layer, but the viscosity of the core layer may be lower than that of the skin layer.

(Flow Casting)

As a method for casting the solution, there is a method of uniformly extruding the prepared dope from the pressurized die onto the metal support, a doctor blade method in which the film thickness of the dope once cast over the metal support is adjusted with a blade, or a reverse roll coater method in which the film thickness is adjusted with counter-rotating rolls. Of these, the method of using the pressurized die is preferred. The pressurized dies include coat-hanger type and T-die type dies, both of which can be preferably used. In addition to the methods described herein, there can be used various methods of casting a cellulose triacetate solution to form a film, which have hitherto been known. Similar effects are obtained by setting respective conditions, considering the difference in boiling point or the like between solvents used. As the endlessly running-metal support used to produce a cellulose acylate film of the invention, there is used a drum mirror-finished with a chrome-plating surface or a stainless belt (which may be said to be a band) mirror-finished by surface polishing. As the pressurized die used to produce a cellulose acylate film of the invention, one or two or more dies may be installed above the metal support. One or two dies are preferred. When two or more dies are installed, the amount of the dope cast may be divided to the respective dies with various proportions, or the dope may be transferred from a plurality of precision metering gear pumps to the dies with respective proportions. The temperature of the cellulose acylate solution used for flow casting is preferably from −10 to 55° C., and more preferably from 25 to 50° C. In that case, the temperature may be the same during all steps, or different in each step. When the temperature is different, it is only required to be a specified temperature just before casting.

(Drying)

As methods for drying the dope on the metal support in the production of the cellulose acylate film, there are generally a method of blowing hot air from the surface side of the metal support (drum or belt), namely from the surface side of a web on the metal support; a method of blowing hot air from the back side of the drum or belt; and a liquid heat-transfer method of allowing a temperature-controlled liquid to contact with the drum or belt at the back side opposite to a dope-casting surface thereof, and heating the drum or belt by heat transfer to control the surface temperature. However, the back-side liquid heat-transfer method is preferred. The surface temperature of the metal support before flow casting may be any, as long as the temperature is equal to or lower than the boiling point of a solvent used in the dope. However, in order to accelerate drying or to reduce flowability of the dope on the metal support, it is preferably set to a temperature 1 to 10° C. lower than the boiling point of a solvent having the highest boiling point of the solvents used. The above is not applied to the case where the cast dope is peeled without drying after cooling.

(Stretching Treatment)

In a cellulose acylate film of the invention, the retardation can be adjusted by stretching treatment. Further, there is a method of positively stretching the film in the width direction, as described, for example, in JP-A-62-115035, JP-A-4-152125, JP-A-4-284211, JP-A-4-298310, and JP-A-11-48271. In order to increase the in-plane retardation value of the cellulose acylate film, the film produced is stretched.

Stretching of the film is carried out at ordinary temperature or under heated conditions. The heating temperature is preferably from a temperature 20° C. lower than the glass transition temperature of the film to a temperature 20° C. higher than that. The stretching of the film may be only longitudinal or lateral uniaxial stretching, or simultaneous or sequential biaxial stretching. The stretching is carried out at a ratio of 1 to 100%, preferably at a ratio of 1 to 50%, and particularly preferably at a ratio of 1 to 35%. A method of contracting the film in TD (width direction) while stretching it in the MD (casting direction), or a method of contracting the film in the MD while stretching it in the TD with a tenter is also effective for adjusting both Re retardation and Rth retardation within the desired ranges. The stretching treatment may be performed in the course of the film formation process, or a raw film taken up after film formation may be subjected to the stretching treatment. In the case of the former, the film may be stretched with the residual solvent contained, and can be preferably stretched at a residual solvent content of 2 to 30%. When the residual solvent is contained in the film in large amounts, the substantial glass transition temperature decreases, so that the stretching temperature is appropriately adjusted.

The thickness of a finished (dried) cellulose acylate film of the invention is preferably within the range of 40 to 180 μm, because the Re retardation and Rth retardation are easily adjustable to adequate values. It is more preferably within the range of 70 to 160 μm, and most preferably within the range of 70 to 160 μm.

The film thickness may be controlled so as to obtain the desired thickness by regulating the concentration of solid matter contained in the dope, the interval between slits of the cap of the die, the extrusion pressure from the die, the speed of the metal support and the like. The width of the cellulose acylate film thus obtained is preferably from 0.5 to 3 m, more preferably from 0.6 to 2.5 m, and still more preferably from 0.8 to 2.2 m. The film is taken up to a length of preferably 100 to 10,000 m, more preferably 500 to 7,000 m, and still more preferably 1,000 to 6,000 m, per roll. At the time of taking up, knurling is preferably given to at least one end of the film. The width thereof is from 3 to 50 mm, and preferably from 5 to 30 mm. The height thereof is from 0.5 to 500 μm, and preferably from 1 to 200 μm. This may be a one-sided press or a two-sided press. Further, the variation in Re values over the whole width is preferably within ±5 nm, and more preferably within ±3 nm. Furthermore, the variation in Rth values is preferably within ±10 nm, and more preferably within ±5 nm. The variations in Re values and Rth values in the longitudinal direction are preferably within the range of the variations in the width direction.

(Optical Characteristics of Cellulose Acylate Film)

As for optical characteristics of a cellulose acylate film of the invention, it is necessary that the Re retardation value and Rth retardation value represented by formula: Re=(nx−ny)×d and formaula: Rth={(nx+ny)/2−nz}×d, respectively, meet the following formulae:

$$46 \leq Re \leq 100 \tag{1}$$

$$Rth = a - 5.9 Re \tag{2}$$

$$520 \leq a \leq 670 \tag{3}$$

wherein Re and Rth are values (unit: nm) at a wavelength of 590 nm, nx is a refractive index in a slow axis direction in a film plane, ny is a refractive index in a fast axis direction in the film plane, nz is a refractive index in a thickness direction of the film, and d is a thickness of the film.

The intercept value a on the y-axis of the straight line represented by equation (2) is 625 nm in consideration of only contrast in viewing the liquid crystal display in an oblique direction, and the black luminance value of a VA mode crystal liquid display increases, as a deviates up and down from 625. That is to say, light leakage occurs to result in showing no black color. Equation (3) shows the permissible limit of a. For the VA mode crystal liquid display, particularly preferred are 55 nm≦Re≦85 nm and 595 nm≦a≦655 nm. Preferred Re and Rth vary depending on the Δn·d value of a VA liquid crystal cell. For example, when the Δn·d value of the VA liquid crystal cell is 350 nm, the most preferred Re and Rth values are from 55 to 60 and from 270 to 290, respectively. When the Δn·d value of the VA liquid crystal cell is 300 nm, the most preferred Re and Rth values are from 62 nm to 68 nm and from 220 nm to 240 nm, respectively. When the Δn·d value of the VA liquid crystal cell is 250 nm, the most preferred Re and Rth values are from 75 nm to 80 nm and from 180 nm to 200 nm, respectively.

However, in consideration of reducing change in color in viewing the liquid crystal display in an oblique direction as well as reducing light leakage, the preferred range of the intercept value a on the y-axis of the straight line represented by equation (2) changes into from 520 nm to 610 nm. When the Δn·d value of the liquid crystal cell is 300 nm, the most preferred Re and Rth values are from 55 nm to 65 nm and from 170 nm to 230 nm, respectively.

Further, it is preferred that both the following relations (A) and (B) hold between Re (λ) and Rth (λ) measured at 25° C. and 60% RH, in which the Re (λ) and Rth (λ) are retardation values Re and Rth at a wavelength of λ nm, respectively:

$$0.80 \leq Re_{(450)}/Re_{(550)} \leq 1.00 \quad \text{and} \quad 1.00 \leq Re_{(650)}/Re_{(550)} \leq 1.20 \tag{A}$$

$$0.90 \leq Rth_{(450)}/Rth_{(550)} \leq 1.00 \quad \text{and} \quad 1.00 \leq Rth_{(650)}/Rth_{(550)} \leq 1.10 \tag{B}$$

The use of an optical film outside these ranges results in the tendency to cause a color shift in an indication of the liquid crystal display.

(Polarizing Plates)

A polarizing plate includes a polarizer and two transparent protective films arranged on both sides thereof. As one protective film, there can be used a cellulose acylate film of the invention. As the other protective film, there may be used an ordinary cellulose acetate film. The polarizers include an iodine-based polarizer, a dye-based polarizer using a dichroic dye and a polyene-based polarizer. The iodine-based polarizer and the dye-based polarizer are generally produced using a polyvinyl alcohol-based film. When a cellulose acylate film of the invention is used as the protective film for the polarizer, the production method of the polarizing plate is not particularly limited, and it can be produced by ordinary methods. There is a method of producing the polarizing plate, which comprises the steps of alkali-treating the resulting cellulose acylate film, and bonding it to both sides of the polarizer prepared by dipping a polyvinyl alcohol film in an iodine solution, followed by stretching, using an aqueous solution of completely saponificated polyvinyl alcohol. In place of the alkali treatment, processing for making adhesion easy as described in JP-A-6-94915 and JP-A-6-118232 may be employed. The adhesives used for bonding the treated surface of the protective film to the polarizer include, for example, polyvinyl alcohol-based adhesives such as polyvinyl alcohol and polyvinyl butyral, and vinyl-based latexes such as butyl acrylate. The polarizing plate generally comprising the polarizer and the protective films for protecting both surfaces of the polarizer, and further comprising a protective film bonded to one surface of the polarizing plate, and a separate film bonded to the opposite surface thereof. The protective film and the separate film are used in order to protect the polarizing plate in shipping of the polarizing plate and product inspection thereof. In this case, the protective film is bonded in order to protect the surface of the polarizing plate, and used on the opposite side to the surface on which the polarizing plate is bonded to a liquid crystal plate. The separate film is used for covering an adhesive layer bonded to the liquid crystal plate, and used on the side of the surface on which the polarizing plate is bonded to the liquid crystal plate.

A cellulose acylate film of the invention is preferably bonded to the polarizer so as to bring a transmission axis of the polarizer into line with the slow axis of a cellulose acylate film of the invention. Evaluations of the prepared polarizer under polarizer cross nicol have revealed that when the perpendicular precision between the slow axis of a cellulose acylate film of the invention and an absorption axis (an axis perpendicular to the transmission axis) of the polarizer is larger than 1°, polarization degree performance under polarizer cross nicol deteriorates to generate light omission. In this case, when it is combined with the liquid crystal cell, sufficient black levels and contrast fail to be obtained. Accordingly, deviation between the direction of the main refractive index nx of a cellulose acylate film of the invention and the direction of the transmission axis of the polarizer is preferably 1° or less, and more preferably 0.5° or less.

In a polarizing plate of the invention, it is preferred that the single plate transmittance (TT), parallel transmittance (PT), cross transmittance (CT) and polarization degree (P) at 25° C. and 60% RH meet at least one of the following formulae (a) to (d):

$$40.0 \leq TT \leq 45.0 \quad (a)$$

$$30.0 \leq PT \leq 40.0 \quad (b)$$

$$CT \leq 2.0 \quad (c)$$

$$95.0 \leq P \quad (d)$$

In the order of the single plate transmittance (TT), the parallel transmittance (PT) and the cross transmittance (CT), more preferred are $40.5 \leq TT \leq 45$, $32 \leq PT \leq 39.5$ and $CT \leq 1.5$, respectively, and still more preferred are $41.0 \leq TT \leq 44.5$, $34 \leq PT \leq 39.0$ and $CT \leq 1.3$, respectively.

polarization degree P is preferably 95.0% or more, more preferably 96.0% or more, and still more preferably 97.0% or more.

In a polarizing plate of the invention, when the cross transmittance at a wavelength of $\lambda$ is taken as $CT(\lambda)$, $CT_{(380)}$, $CT_{(410)}$ and $CT_{(700)}$ preferably meet at least one of the following equations (e) to (g):

$$CT_{(380)} \leq 2.0 \quad (e)$$

$$CT_{(410)} \leq 1.0 \quad (f)$$

$$CT_{(700)} \leq 0.5 \quad (g)$$

More preferred are $CT_{(380)} \leq 1.95$, $CT_{(410)} \leq 0.9$ and $CT_{(700)} \leq 0.49$, and still more preferred are $CT_{(380)} \leq 1.90$, $CT_{(410)} \leq 0.8$ and $CT_{(700)} \leq 0.48$.

In a polarizing plate of the invention, the variation ($\Delta CT$) in cross transmittance and the variation in polarization degree ($\Delta P$) at the time when the polarizing plate has been allowed to stand under conditions of 60° C. and 95% RH for 500 hours meet at least one of the following formulae (j) and (k):

$$-6.0 \leq \Delta CT \leq 6.0 \quad (j)$$

$$-10.0 \leq \Delta P \leq 0.0 \quad (k)$$

wherein the variation indicates a value obtained by subtracting a measured value before the test from a measured value after the test.

More preferred are $-5.8 \leq \Delta CT \leq 5.8$ and $-9.5 \leq \Delta P \leq 0.0$, and still more preferred are $-5.6 \leq \Delta CT \leq 5.6$ and $-9.0 \leq \Delta P \leq 0.0$.

In a polarizing plate of the invention, the variation ($\Delta CT$) in cross transmittance and the variation in polarization degree ($\Delta P$) at the time when the polarizing plate has been allowed to stand under conditions of 60° C. and 90% RH for 500 hours meet at least one of the following formulae (h) and (i):

$$-3.0 \leq \Delta CT \leq 3.0 \quad (h)$$

$$-5.0 \leq \Delta P \leq 0.0 \quad (i)$$

In a polarizing plate of the invention, the variation ($\Delta CT$) in cross transmittance and the variation in polarization degree ($\Delta P$) at the time when the polarizing plate has been allowed to stand under conditions of 80° C. for 500 hours meet at least one of the following formulae (l) and (m):

$$-3.0 \leq \Delta CT \leq 3.0 \quad (l)$$

$$-2.0 \leq \Delta P \leq 0.0 \quad (m)$$

The single plate transmittance (TT), parallel transmittance (PT) and cross transmittance (CT) of the polarizing plate are measured within the range of 380 to 780 nm using UV3100PC (manufactured by Shimadzu Corporation), and the average value of ten measurements (the average value at 400 to 700 nm) is used as each of TT, PT and CT. The polarization degree (P) can be found from polarization degree (%)=100×((parallel transmittance−cross transmittance)/(parallel transmittance+cross transmittance))$^{1/2}$. Polarizing plate durability tests are made in two types of forms, (1) only the polarizing plate and (2) the polarizing plate bonded to a glass with an adhesive. In the measurement in the form of only the polarizing plate, a cellulose acylate film of the invention is combined so that it is put between two polarizers, and the two same ones are prepared, followed by measurement. In the glass-bonded form, two samples (about 5 cm×5 cm) are prepared in which the polarizing plate is bonded onto the glass so that a cellulose acylate film of the invention is disposed on the glass side. In the measurement of the single plate transmittance, this sample is set directing the film side thereof to a light source, and the measurement is made. The measurements are made for the two samples, respectively, and the average value therefrom is taken as the single plate transmittance.

(Moisture-Proofed Bag)

In the invention, a "moisture-proofed bag" is defined by moisture permeability measured based on the cup method (JIS-Z208). Considering the influence of environmental humidity outside the bag, it is preferred to use a material having a moisture permeability at 40° C. and 90% RH of 30 g/(m$^2$·day) or less. Exceeding 30 g/(m$^2$·day) results in failure to prevent the influence of environmental humidity outside the bag. The moisture permeability is more preferably 10 g/(m$^2$·day) or less, and most preferably 5 g/(m$^2$·day) or less.

There is no particular limitation on the material for the moisture-proofed bag treatment, as long as it satisfies the above-mentioned moisture permeability, and known materials can be used (see the following documents 1 to 3):

(Document 1) *Hoso Zairyo Binran* (*Manual of Packaging Materials*), Japan Packaging Institute (1995)

(Document 2) *Hoso Zairyo no Kiso Chisiki* (*Basic Knowledge of Packaging Materials*), Japan Packaging Institute (November, 2001)

(Document 3) *Kinosei Hoso Nyiumon* (*Introduction to Functional Packaging*), 21st Century Packaging Research Institute (Feb. 28, 2002, first edition, first copy)

In the invention, a material low in moisture permeability, light in weight and easy to handle is desirable, and a deposited film obtained by depositing silica, alumina, a ceramic material or the like over a plastic film, or a composite film such as a laminated film of a plastic film and an aluminum foil can be particularly preferably used. There is no particular limitation on the thickness of the aluminum foil, as long as the foil has such a thickness that the humidity in the bag is not influenced by environmental humidity. However, the thickness of the foil is preferably from several micrometers to several hundred micrometers, and more preferably from 10 µm to 500 µm. The humidity in the moisture-proofed bag used in the invention preferably satisfies either of the following (a) and (b):

(a) The humidity is from 43 to 70% RH, and more preferably from 45 to 65% RH, at 25° C. in a state in which the polarizing plate is packaged; and (b) The humidity in the bag in a state in which the polarizing plate is packaged is 15% RH or less based on that at the time when the polarizing plate is bonded to (or superposed on) a liquid crystal panel.

(Surface Treatment)

A cellulose acylate film of the invention may be surface treated in some cases, thereby being able to improve adhesion between the cellulose acylate film and each functional layer (for example, an undercoat layer or a back layer). For example, there can be used glow discharge treatment, ultraviolet irradiation treatment, corona treatment, flame treatment, or acid or alkali treatment. The glow discharge treatment as referred to herein may be treatment with low-temperature plasma generated in a low-pressure gas having a pressure of 10$^{-3}$ to 20 Torr, and plasma treatment under atmospheric pressure is also preferred. A plasma-exciting gas is a gas to be excited by plasma under the above-mentioned conditions, and examples thereof include argon, helium, neon, krypton, xenon, nitrogen, carbon dioxide, a flon such as tetrafluoromethane, and a mixture thereof. These are described in JIII Journal of Technical Disclosure No. 2001-1745, pages 30 to 32 (published on May 15, 2001, Japan Institute of Invention and Innovation) in detail. In plasma treatment under atmospheric pressure to which attention has recently been paid, for example, an irradiation energy of 20 to 500 Kgy is used under 10 to 1,000 Kev. More preferably, an irradiation energy of 20 to 300 Kgy is used under 20 to 300 Kev. Of these, particularly preferred is alkali saponification treatment, which is very effective as surface treatment for the cellulose acylate film.

The alkali saponification treatment can be preferably conducted by a method of directly dipping the cellulose acylate film into a tank of a saponification solution or a method of coating the cellulose acylate film with the saponification solution. Coating methods include dip coating, curtain coating, extrusion coating, bar coating and E-type coating. As a solvent for the alkali saponification treatment coating solution, there is preferably selected a solvent which has good wettability for applying the saponification solution onto a transparent support, and keeps surface properties good without forming unevenness on a surface of the transparent support. Specifically, an alcoholic solvent is preferred, and isopropyl alcohol is particularly preferred. Further, an aqueous solution of a surfactant can also be used as the solvent. An alkali of the alkali saponification coating solution is preferably an alkali soluble in the above-mentioned solvent, and more preferably KOH or NaOH. The pH of the saponification coating solution is preferably 10 or more, and more preferably 12 or more. The alkali saponification reaction is conducted preferably at room temperature for 1 second to 5 minutes, more preferably for 5 seconds to 5 minutes, and particularly preferably for 20 seconds to 3 minutes. After the alkali saponification reaction, it is preferred that the saponification solution coating surface is washed with water or an acid, followed by washing with water.

(Antireflective Layers)

A functional film such as an antireflective layer is preferably provided on the transparent protective film disposed on the opposite side of the liquid crystal cell of the polarizing plate. In particular, in the invention, there is suitably used an antireflective layer in which at least a light scattering layer and a lower refractive index layer are laminated on the transparent protective film in this order, or an antireflective layer in which a medium refractive index layer, a higher refractive index layer and a lower refractive index layer are laminated on the transparent protective film in this order. Preferred examples thereof are described below.

Preferred examples of the antireflective layers in which the light scattering layer and the lower refractive index layer are provided on the transparent protective film will be described.

Matte particles are dispersed in the light scattering layer used in the invention, and the refractive index of a material of the light scattering layer excluding the matte particles is preferably within the range of 1.50 to 2.00, and the refractive index of the lower refractive index layer is preferably within the range of 1.35 to 1.49. In the invention, the light scattering layer has both anti-glare properties and hard coat properties, and may include either one layer or a plurality of layers, for example, 2 to 4 layers.

The surface unevenness shape of the antireflective layer is preferably designed so as to provide a center-line average roughness Ra of 0.08 to 0.40 µm, a 10-point average roughness Rz of 10 times or more of Ra, an average concave-convex distance Sm of 1 to 100 µm, a standard deviation of the convex height from the deepest part of concaves and convexes of 0.5 µm or less, a standard deviation of the average concave-convex distance Sm on the basis of the center line of 20 µm or less, and 10% or more of a face having an angle of inclination of 0 to 5 degrees, thereby achieving sufficient anti-glare properties and visually uniform matte texture. For the color of reflected light under a C light source, when the a* value is from −2 to 2, the b* value is from −3 to 3, and the ratio of the minimum value and the maximum value of the reflectance within the range of 380 to 780 nm is from 0.5 to 0.99, the color of reflected light preferably become neutral. Further, by adjusting the b* value of transmitted light under the C light source to 0 to 3, the yellowish color of a white indication at the time when it is applied to a display is preferably decreased. Furthermore, when the standard deviation of luminance distribution measured on the film by inserting a lattice of 120 μm×40 μm between the surface light source and the antireflective film is 20 or less, dazzling at the time when the film of the invention is applied to a high definition panel is preferably decreased.

When the antireflective layer used in the invention has a mirror reflectance of 2.5% or less, a transmittance of 90% or more and a 60-degree gloss value of 70% or less, as optical characteristics, reflection of outside light can be inhibited, and visibility is improved. Accordingly, such an antireflective layer is preferred. In particular, the mirror reflectance is more preferably 1% or less, and most preferably 0.5% or less. The antireflective layer having a haze of 20 to 50%, an inner haze/total haze value of 0.3 to 1, a decrease in a haze value after formation of the lower refractive index layer from a haze value up to the light scattering layer of 15% or less, a transmitted image clarity at a comb width of 0.5 mm of 20 to 50%, and a vertical transmitted light/transmittance in a direction inclined at 2 degrees to the vertical direction ratio of 1.5 to 5.0 achieves prevention of dazzling on a high definition LCD panel and reduction in blurring of letters and the like. This is therefore preferred.

(Lower Refractive Index Layers)

The refractive index of the lower refractive index layer of the antireflective film used in the invention is from 1.20 to 1.49, and preferably within the range of 1.30 to 1.44. In terms of a decrease in reflectance, it is preferred that the refractive index of the lower refractive index layer to meet the following equation (1):

$$(m/4) \times 0.7 < n1d1 < (m/4) \times 1.3 \quad (1)$$

wherein m is a positive odd number, n1 is a refractive index of the lower refractive index layer, and d1 is a thickness (nm) of the lower refractive index layer. λ is a wavelength, and a value within the range of 500 to 550 nm.

Materials for forming the lower refractive index layer used in the invention will be described below.

The lower refractive index layer used in the invention contains a fluorine-containing polymer as a lower refractive index binder. The fluorine-containing polymer is preferably a fluorine-containing polymer crosslinkable by heat or ionizing radiation, which has a coefficient of dynamic friction of 0.03 to 0.20, a contact angle to water of 90 to 120° and a slide-down angle of pure water of 70° or less. When the antireflective film used in the invention is attached to an image display, lower peeling force from a commercially available adhesive tape preferably results in easy peeling of a seal or memo adhered thereto. The peeling force is preferably 500 gf or less, more preferably 300 gf or less, and most preferably 100 gf or less. The higher the surface hardness measured with a microhardness meter is, the more difficult to be scratched the film is. The surface hardness of the film is preferably 0.3 GPa or more, and more preferably 0.5 GPa or more.

The fluorine-containing polymers used in the lower refractive index layer include a fluorine-containing copolymer having fluorine-containing monomer units and constitutional units for imparting crosslinking reactivity as constituent components, as well as a hydrolysate and a dehydrated condensate of a perfluoroalkyl group-containing silane compound (for example, (heptadecafluoro-1,1,2,2-tetrahydrodecyl)triethoxysilane.

Specific examples of the fluorine-containing monomer units include a fluoroolefin (for example, fluoroethylene, vinylidene fluoride, tetrafluoroethylene, perfluorooctylethylene, hexafluoropropylene or perfluoro-2,2-dimethyl-1,3-dioxole), a partially or completely fluorinated alkyl ester derivative of (meth)acrylic acid (for example, Biscoat 6FM (manufactured by Osaka Organic Chemical Industry, Ltd.) or M-2020 (manufactured by Daikin Industries, Ltd.)), and a completely or partially fluorinated vinyl ether. Preferred is a perfluoroolefin, and from the viewpoints of refractive index, solubility, transparency and availability, particularly preferred is hexafluoropropylene.

The constitutional units for imparting crosslinking reactivity include a constitutional unit obtained by polymerization of a monomer previously having a self crosslinkable functional group in its molecule, such as glycidyl (meth)acrylate or glycidyl vinyl ether, a constitutional unit obtained by polymerization of a monomer having a carboxyl group, a hydroxyl group, an amino group or a sulfo group (for example, (meth)acrylic acid, methylol (meth)acrylate, hydroxyalkyl (meth)acrylate, allyl acrylate, hydroxyethyl vinyl ether, hydroxybutyl vinyl ether, maleic acid or crotonic acid), and a constitutional unit obtained by introducing a crosslinkable group such as a (meth)acryloyl group into the above-mentioned constitutional unit by polymer reaction (for example, the crosslinkable group can be introduced by a technique of reacting acryloyl chloride with a hydroxyl group).

In addition to the above-mentioned fluorine-containing monomer unit and constitutional unit for imparting crosslinking reactivity, a fluorine-free monomer can also be appropriately copolymerized from the viewpoints of solubility in the solvent and transparency of the film. There is no particular limitation on the simultaneously usable monomer unit, and examples thereof include an olefin (such as ethylene, propylene, isoprene, vinyl chloride or vinylidene chloride), an acrylic ester (such as methyl acrylate, methyl acrylate, ethyl acrylate or 2-ethylhexyl acrylate), a methacrylic ester (such as methyl methacrylate, ethyl methacrylate, butyl methacrylate or ethylene glycol dimethacrylate), a styrene derivative (such as styrene, divinylbenzene, vinyltoluene or α-methylstyrene), a vinyl ether (such as methyl vinyl ether, ethyl vinyl ether or cyclohexyl vinyl ether), a vinyl ester (such as vinyl acetate, vinyl propionate or vinyl cinnamate), an acrylamide (such as N-tert-butylacrylamide or N-cyclohexylacrylamide), a methacrylamide and an acrylonitrile derivative.

A hardener may be appropriately used in combination with the above-mentioned polymer as described in JP-A-10-25388 and JP-A-10-147739.

(Light Scattering Layers)

The light scattering layer is formed in order to impart light diffusibility caused by surface scattering and/or internal scattering and hard coat properties for improving scratch resistance of the film to the film. Accordingly, the light scattering layer is formed containing a binder for imparting hard coat properties, matte particles for imparting light diffusibility and an inorganic filler for increasing refractive index, preventing crosslinking contraction and increasing strength as needed.

In order to impart hard coat properties, the thickness of the light scattering layer is preferably from 1 to 10 μm, and more preferably from 1.2 to 6 μm. When the thickness is too thin, hard coat properties become insufficient. On the other hand, when the thickness is too thick, curling or brittleness is deteriorated, resulting in insufficient processing aptitude.

The binder of the scattering layer is preferably a polymer having a saturated hydrocarbon chain or a polyether chain as a main chain, and more preferably a polymer having a saturated hydrocarbon chain as a main chain. Further, it is preferred that the binder polymer has a crosslinked structure. The binder polymer having a saturated hydrocarbon chain as a main chain is preferably a polymer of an ethylenic unsaturated monomer. The binder polymer having a saturated hydrocarbon chain as a main chain and a crosslinked structure is preferably a (co)polymer of a monomer having two or more ethylenic unsaturated groups. In order to increase the refractive index, there can also be selected a monomer containing an aromatic ring or at least one atom selected from a halogen atom, a sulfur atom, a phosphorous atom and a nitrogen atom in its molecule.

The monomers having two or more ethylenic unsaturated groups include an ester of a polyhydric alcohol and (meth)acrylic acid (for example, ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)-acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate or polyester polyacrylate), an ethylene oxide-modified product thereof, vinylbenzene and a derivative thereof (for example, 1,4-divinylbenzene, 4-vinylbenzoic acid-2-acryloyl ethyl ester or 1,4-divinylcyclohexanone), a vinylsulfone (for example, divinylsulfone), an acrylamide (for example, methylenebisacrylamide) and methacrylamide. The above-mentioned monomers may be used as a combination of two or more thereof.

Specific examples of the higher refractive index monomers include bis(4-methacryloylthiophenyl)sulfide, vinylnaphthalene, vinylphenylsulfide and 4-methacryloxyphenyl-4'-methoxyphenyl thioether. These monomers may also be used as a combination of two or more thereof.

Polymerization of these ethylenic unsaturated group-containing monomers can be conducted by irradiation of ionizing radiation or heating in the presence of a photo-radical initiator or a thermal radical initiator.

Accordingly, a coating solution containing the ethylenic unsaturated group-containing monomer, the photo-radical initiator or the thermal radical initiator, the matte particles and the inorganic filler is prepared, and applied onto a transparent support. Then, the coating solution applied can be cured by polymerization reaction using ionizing radiation or heat to form an antireflective film. As these photo-radical initiators and the like, known ones can be used.

The polymer having a polyether as a main chain is preferably a ring-opening polymer of a multifunctional epoxy compound. Ring-opening polymerization of the multifunctional epoxy compound can be performed by irradiation of ionizing radiation or heating in the presence of the photo-radical initiator or the thermal radical initiator. Accordingly, a coating solution containing the multifunctional epoxy compound, the photo-radical initiator or the thermal radical initiator, the matte particles and the inorganic filler is prepared, and applied onto a transparent support. Then, the coating solution applied can be cured by polymerization reaction using ionizing radiation or heat to form an antireflective film.

In place of or in addition to the monomer having two or more ethylenic unsaturated groups, a monomer having a crosslinkable functional group is used to introduce the crosslinkable functional group into the polymer, and the crosslinked structure may be introduced into the binder polymer by the reaction of this crosslinkable functional group.

Examples of the crosslinkable functional groups include an isocyanate group, an epoxy group, an aziridine group, an oxazoline group, an aldehyde group, a carbonyl group, a hydrazine group, a carboxyl group, a methylol group and an active methylene group. Vinylsulfonic acid, an acid anhydride, a cyanoacrylate derivative, melamine, etherified methylol, an ester, an urethane and a metal alkoxide such as tetramethoxysilane can also be utilized as a monomer for introducing the crosslinked structure. A functional group showing crosslinkability as a result of decomposition reaction, such as a block isocyanate group, may also be used. That is to say, in the invention, the crosslinkable functional group may be a group showing reactivity as a result of decomposition without immediately showing reactivity.

These crosslinkable functional group-containing binder polymers can form the crosslinked structure by heating after coating.

The light scattering layer contains matte particles larger than filler particles and having an average particle size of 1 to 10 μm, preferably 1.5 to 7.0 μm, for example, inorganic compound particles or resin particles, in order to impart antiglare properties. Preferred specific examples of the above-mentioned matte particles include, for example, inorganic compound particles such as silica particles and $TiO_2$ particles; and resin particles such as acrylic resin particles, crosslinked acrylic resin particles, polystyrene particles, crosslinked styrene particles, melamine resin particles and benzoguanamine resin particles. Above all, crosslinked styrene particles, crosslinked acrylic resin particles, crosslinked acrylic styrene resin particles and silica particles are preferred.

The usable form of the particles may be either spherical or irregular.

Further, two or more kinds of matte particles different in particle size may be used in combination. The matte particles larger in particle size can impart anti-glare properties, and the matte particles smaller in particle size can impart another optical characteristic.

Further, the particle size distribution of the above-mentioned matte particles is most preferably monodisperse, and it is preferred that the respective particles are as similar as possible in particle size. For example, when particles having a particle size 20% or more larger than the average particle size are defined as coarse particles, the ratio of the coarse particles to the total number of particles is preferably 1% or less, more preferably 0.1% or less, and still more preferably 0.01% or less. The matte particles having such a particle size distribution is obtained by classification after ordinary synthesis reaction, and the matte particles having a more preferred distribution can be obtained by increasing the number of times of classification or intensifying the degree thereof.

The above-mentioned matte particles are contained in the light scattering layer so that the amount of the matte particles in the light scattering layer formed is preferably from 10 to 1000 mg/m$^2$, and more preferably from 100 to 700 mg/m$^2$. The particle size distribution of the matte particles is measured by the Coulter counter method, and the distribution measured is converted to a particle number distribution.

In order to increase the refractive index of the layer, the light scattering layer preferably contain an inorganic filler selected from titanium, zirconium, aluminum, indium. Zinc, tin and antimony and having an average particle size of 0.2 μm or less, preferably 0.1 μm or less and more preferably 0.06 μm or less, in addition to the above-mentioned matte particles.

Conversely, in the light scattering layer in which higher refractive index particles are used in order to increase the difference in refractive index from the matte particles, it is also preferred to use an oxide of silicon in order to keep the refractive index of the layer rather low. The preferred particle size is the same as that of the inorganic filler described above.

Specific examples of the inorganic fillers used in the light scattering layer include $TiO_2$, $ZrO_2$, $Al_2O_3$, $In_2O_3$, ZnO, $SnO_2$, $Sb_2O_3$, ITO and $SiO_2$, $TiO_2$ and $ZrO_2$ are particularly preferred in terms of increasing the refractive index. A surface of the inorganic filler is preferably subjected to silane coupling treatment or titanium coupling treatment, and a surface treating agent which gives a functional group reactable with a binder species to the filler surface is preferably used.

The amount of these inorganic fillers added is preferably from 10 to 90%, more preferably from 20 to 80%, and particularly preferably from 30 to 75%, based on the total weight of the light scattering layer.

Such a filler has a particle size sufficiently small compared to the wavelength of light, so that scattering does not occur, and a dispersion in which the filler is dispersed in a binder polymer behaves as an optically uniform material.

The refractive index of a bulk of a mixture of the binder and the inorganic filler in the light scattering layer is preferably from 1.48 to 2.00, and more preferably from 1.50 to 1.80. In order to adjust the refractive index within the above-mentioned range, the kind and amount ratio of binder and inorganic filler may be appropriately selected. How to select them can be previously experimentally easily known.

In the light scattering layer, in order to prevent uneven coating, uneven drying, point defects and the like to secure surface uniformity, either of a fluorine-containing surfactant and a silicone-based surfactant or both thereof are contained in a coating composition for formation of the anti-glare layer. In particular, the fluorine-based surfactant is preferably used, because the addition thereof in a smaller amount manifests the effect of improving surface failures such as uneven coating, uneven drying and point defects. An object thereof is to enhance productivity by giving high-speed coating aptitude while upgrading surface uniformity.

The antireflective layer in which the medium refractive index layer, the higher refractive index layer and the lower refractive index layer are laminated on the transparent protective film in this order will be described below.

The antireflective film having the layer structure of the medium refractive index layer, the higher refractive index layer and the lower refractive index layer (outermost layer) on the substrate in this order is designed so as to have refractive indexes satisfying the following relationship:

The refractive index of the higher refractive index layer> the refractive index of the medium refractive index layer> refractive index of the transparent support> the refractive index of the lower refractive index layer Further, a hard coat layer may be provided between the transparent support and the medium refractive index layer. Furthermore, the antireflective layer may comprise an medium refractive index hard coat layer, the higher refractive index layer and the lower refractive index layer. Examples thereof are described in JP-A-8-122504, JP-A-8-110401, JP-A-10-300902, JP-A-2002-243906 and JP-A-2000-111706.

In addition, another function may be imparted to each layer, and examples thereof include a soil-resistant lower refractive index layer and an antistatic higher refractive index layer (for example, see JP-A-10-206603 and JP-A-2002-243906).

The haze of the antireflective film is preferably 5% or less, and more preferably 3% or less. Further, the strength of the film measured by the pencil hardness test according to JIS K5400 is preferably H or more, more preferably 2H or more, and most preferably 3H or more.

(Higher refractive Index Layers and Medium Refractive Index Layers)

The higher refractive index layer of the antireflective film is a curable film containing at least ultrafine inorganic compound particles having an average particle size of 100 nm or less and a higher refractive index and a matrix binder.

The ultrafine inorganic compound particles having a higher refractive index include an inorganic compound having a refractive index of 1.65 or more, preferably 1.9 or more. Examples thereof include oxides of Ti, Zn, Sb, Sn, Zr, Ce, Ta, La and In, and complex oxides containing these metal atoms.

Such ultrafine particles are produced by treatment of particle surfaces with a surface treating agent (for example, see JP-A-11-295503, JP-A-11-153703 and JP-A-2000-9908 for a silane coupling agent, and JP-A-2001-310432 for an anionic compound or an organic metal coupling agent), formation of a core-shell structure in which the higher refractive index particles are taken as a core (see JP-A-2001-166104) and combined use of a specified dispersing agent (see JP-A-11-153703, U.S. Pat. No. 6,210,858 and JP-A-2002-2776069).

The materials for forming the matrix include a thermoplastic resin and a thermosetting resin which have hitherto been known.

Further, preferred is at least one composition selected from a multifunctional compound-containing composition having at least two or more of radical and/or cationic polymerizable groups, a hydrolytic group-containing organic metal compound and a partial condensate composition thereof. Examples thereof include compositions described in JP-A-2000-47004, JP-A-2001-315242, JP-A-2001-31871 and JP-A-2001-296401.

Furthermore, a colloidal metal oxide obtained from a hydrolyzed condensate of a metal alkoxide and a curable film obtained from a metal alkoxide composition are also preferred. These are described, for example, in JP-A-2001-293818.

The refractive index of the higher refractive index layer is generally from 1.70 to 2.20. The thickness of the higher refractive index layer is preferably from 5 nm to 10 μm, and more preferably from 10 nm to 1 μm.

The refractive index of the medium refractive index layer is adjusted to a value between the refractive index of the lower refractive index layer and that of the higher refractive index layer. The refractive index of the medium refractive index layer is preferably from 1.50 to 1.70. Further, the thickness thereof is preferably from 5 nm to 10 μm, and more preferably from 10 nm to 1 μm.

(Lower Refractive Index Layers)

The lower refractive index layer is sequentially laminated on the higher refractive index layer. The refractive index of the lower refractive index layer is from 1.20 to 1.55, and preferably from 1.30 to 1.50.

The lower refractive index layer is preferably constructed as an outermost layer having scratch resistance and soil resistance. As a means for largely improving scratch resistance, it is effective to impart slipperiness to the surface, and a means using a silicone-introduced or fluorine-introduced thin film layer which has hitherto been known can be applied.

The refractive index of the fluorine-containing compound is preferably from 1.35 to 1.50, and more preferably from 1.36 to 1.47. Further, the fluorine-containing compound is preferably a compound containing fluorine atoms in an amount ranging from 35 to 80% by weight and having a crosslinkable or polymerizable functional group.

The fluorine-containing compounds include, for example, compounds described in JP-A-9-222503, paragraph numbers (0018) to (0026), JP-A-11-38202, paragraph numbers (0019) to (0030), JP-A-2001-40284, paragraph numbers (0027) to (0028) and JP-A-2000-284102.

The silicone compound is a compound having a polysiloxane structure, and preferably one containing a curable functional group or a polymerizable functional group in its polymer chain to form a crosslinked structure in the film. Examples thereof include a reactive silicone (for example, Silaplane (manufactured by Chisso Corporation) and a polysiloxane having silanol groups at both ends thereof (JP-A-11-258403).

The crosslinking or polymerization reaction of the fluorine-containing and/or siloxane polymer having a crosslinkable or polymerizable group is preferably conducted by light irradiation or heating of a coating composition containing a polymerization initiator, a sensitizer and the like for forming the outermost layer, simultaneously with or after the coating thereof.

Further, a sol-gel cured film is also preferred which is obtained by curing an organic metal compound such as a silane coupling agent and a silane coupling agent containing a specified fluorine-containing hydrocarbon group by condensation reaction under the coexistence of a catalyst.

Examples thereof include polyfluoroalkyl group-containing silane compounds or partially hydrolyzed condensates thereof (compounds described in JP-A-58-142958, JP-A-58-147483, JP-A-58-147484, JP-A-9-157582 and JP-A-11-106704), and fluorine-containing long chain group-containing or perfluoroalkylether group-containing silyl groups (compounds described in JP-A-2000-117902, JP-A-2001-48590 and JP-A-2002-53804).

The lower refractive index layer can contain, as additives other than the above, a filler (for example, silicon dioxide (silica), a lower refractive index inorganic compound having an average primary particle size of 1 to 150 nm such as fluorine-containing particles (magnesium fluoride, calcium fluoride or barium fluoride) or fine organic particles described in JP-A-11-3820, paragraph numbers (0020) to (0038)), a silane coupling agent, a slipping agent, a surfactant and the like.

When the lower refractive index layer is positioned as an under layer to the outermost layer, it may be formed by a vapor phase method (such as a vacuum deposition method, a sputtering method, an ion plating method or a plasma CVD method). A coating method is preferred in that the lower refractive index layer can be inexpensively produced.

The film thickness of the lower refractive index layer is preferably from 30 to 200 nm, more preferably from 50 to 150 nm, and most preferably from 60 to 120 nm.

(Layers Other than Antireflective Layer)

Further, a hard coat layer, a forward scattering layer, a primer layer, an antistatic layer, an undercoat layer, a protective layer or the like may be provided.

(Hard Coat Layers)

The hard coat layer is provided on a surface of the support in order to impart physical strength to the transparent protective film having the antireflective layer. In particular, it is preferably provided between the transparent support and the above-mentioned higher refractive index layer. The hard coat layer is preferably formed by crosslinking reaction or polymerization reaction of a light- and/or heat-curable compound. The curable functional group is preferably a light-polymerizable functional group, and a hydrolysable functional group-containing organic metal compound, particularly an organic alkoxysilyl compound is preferred. Specific examples of these compounds include compounds similar to those exemplified for the higher refractive index layers. Specific constituent compositions of the hard coat layers include, for example, ones described in JP-A-2002-144913, JP-A-2000-9908 and PCT International Publication No. 00/46617 pamphlet.

The higher refractive index layer can serve as the hard coat layer. In such a case, it is preferred that fine particles are finely dispersed using the technique described for the higher refractive index layer and allowed to be contained in the hard coat layer to form it.

The hard coat layer can also serve as an anti-glare layer (described later) which is allowed to contain particles having an average particle size of 0.2 to 10 μm to impart anti-glare properties.

The thickness of the hard coat layer can be suitably designed according to its use. The thickness of the hard coat layer is preferably from 0.2 to 10 μm, and more preferably from 0.5 to 7 μm.

The strength of the hard coat layer measured by the pencil hardness test according to JIS K5400 is preferably H or more, more preferably 2H or more, and most preferably 3H or more. Further, in the Taber test according to JIS K5400, it s preferred that the abrasion loss of a test piece after the test is as small as possible.

(Antistatic Layers)

When the antistatic layer is provided, it is preferred to impart a conductivity of $10^{-8}$ ($\Omega cm^{-3}$) or less in volume resistivity. It is possible to impart a volume resistivity of $10^{-8}$ ($\Omega cm^{-3}$) by use of a hygroscopic material, a water-soluble inorganic salt, a certain surfactant, a cationic polymer, an anionic polymer or colloidal silica. However, it largely depends on temperature and humidity, so that there is the problem that sufficient conductivity can not be secured at low humidity. Accordingly, a metal oxide is preferred as a material for a conductive layer. Some metal oxides are colored, and such metal oxides are unfavorable because the whole film is colored when they are used as the materials for the conductive layer. Metals forming non-colored metal oxides include Zn, Ti, Sn, Al, In, Si, Mg, Ba, Mo, W and V, and metal oxides containing these as main components are preferably used. Specific examples thereof include $ZnO$, $TiO_2$, $SnO_2$, $Al_2O_3$, $In_2O_3$, $SiO_2$, $MgO$, $BaO$, $MoO_3$, $WO_3$, $V_2O_5$ and a complex oxide thereof, and particularly preferred are $ZnO$, $TiO_2$ and $SnO_2$. As for examples containing heteroatoms, addition of Ai or In to $ZnO$, addition of Sb, Nb or a halogen atom to $SnO_2$, and addition of Nb or Ta to $TiO_2$ are effective. Furthermore, as described in JP-B-59-6235, there may be used a material in which the above-mentioned metal oxide is adhered to different crystalline metal particles or a fibrous material (for example, titanium oxide). The volume resistivity and the surface resistivity are physical values different from each other, and therefore can not be simply compared. However, in order to secure a conductivity of $10^{-8}$ ($\Omega cm^{-3}$) or less in volume resistivity, the conductive layer may have a surface resistivity of approximately $10^{-10}$ ($\Omega/square$) or less, more preferably $10^{-8}$ ($\Omega/square$) or less. The surface resistivity of the conductive layer is required to be measured as a value at the time when the antistatic layer is disposed as the uppermost layer, and can be measured at a stage in the course of formation of the laminated film described in this specification.

(Liquid Crystal Displays)

An cellulose acylate film of the invention as a optical compensating sheet or the polarizer using a cellulose acylate film of the invention is advantageously used in a liquid crystal display. A cellulose acylate film of the invention can be used in liquid crystal cells of various display modes. There have been proposed various display modes such as TN (twisted nematic), IPS (in-plane switching), FLC (ferroelectric liquid crystal), AFLC (anti-ferroelectric liquid crystal) OCB (optically compensatory bend), STN (supper twisted nematic), VA (vertically aligned) and HAN (hybrid aligned nematic) modes. Of these, the VA mode can be most preferably used.

In the liquid crystal cell of the VA mode, rod-like liquid crystal molecules are substantially vertically orientated at the time when no voltage is applied.

In addition to (1) the liquid crystal cell of the VA mode in a narrow sense in which rod-like liquid crystal molecules are substantially vertically orientated at the time when no voltage is applied, and substantially horizontally orientated at the time when voltage is applied (described in JP-A-2-176625), the liquid crystal cells of the VA mode include (2) an (MVA mode) liquid crystal cell in which the VA mode is multidomained for enlarging viewing angles (described in *SID97, Digest of tech. Papers (Previous Sumnaries of Lectures)* 28 (1997) 845), (3) a liquid crystal cell of a mode (n-ASM mode) in which rod-like liquid crystal molecules are substantially vertically orientated at the time when no voltage is applied, and torsionally multidomain-orientated at the time when voltage is applied (described in *Previous Summaries of Lectures in the Liquid Crystal Discussion of Japan,* 58-59 (1998)), and (4) a liquid crystal cell of a SURVAIVAL mode (introduced in LCD International 98).

The liquid crystal display of the VA mode comprises a liquid crystal cell and two polarizing plates disposed on both sides thereof. The liquid crystal cell carries a liquid crystal between two electrode substrates. In one embodiment of the transmission liquid crystal display of the invention, one optical compensating sheet of the invention (i.e., a cellulose acylate film) is disposed between the liquid crystal cell and one polarizing plate, or two optical compensating sheets are each disposed between the liquid crystal cell and one polarizing plate, and between the liquid crystal cell and the other polarizing plate, respectively.

In the most preferred embodiment of the transmission liquid crystal display of the invention, the above-mentioned optical compensating sheet is used only as the transparent protective film for one polarizing plate (between the liquid crystal cell and the polarizer. The protective layer on the opposite side of the polarizer may be an ordinary cellulose acylate film, which is preferably thinner than the cellulose acylate of the invention. For example, it preferably has a thickness of 40 to 80 μm. Examples thereof include but are not limited to commercially available KC4UX2M (40 μm, manufactured by Konica Minolta Opto, Inc.), KC5UX (60 μm, manufactured by Konica Minolta Opto, Inc.) and Fujitac TD80UF (80 μm, manufactured by Fuji Photo Film Co., Ltd.).

EXAMPLES

The invention will be specifically illustrated with reference to the following examples, but the invention should not be construed as being limited thereto.
(Measuring Methods)
Characteristics of a cellulose acylate film were measured by the following methods.
(Retardations Re and Rth)
The cellulose acylate film was moisture-conditioned at 25° C. and 60% RH for 24 hours, and then measured at a wavelength of 590 nm using KOBRA 21ADH (manufactured by Oji Sceientific Instruments). The retardation value (Re) in a film plane of the cellulose acylate film and retardation value (Rth) in a film thickness direction were calculated according to the following formula (I) and (II), respectively:

$$Re = (nx - ny) \times d \quad (I)$$

$$Rth = \{(nx + ny)/2 - nz\} \times d \quad (II)$$

wherein nx is a refractive index in an x direction (i.e., a slow axis direction) in the film plane, ny is a refractive index in a y direction (i.e., a fast axis direction) in the film plane, nz is a refractive index in a direction perpendicular to the plane of the film, and d is a thickness (unit: nm) of the film.

Specifically, Re was measured by allowing light having a wavelength of 590 nm to be incident in a normal line direction of the film in KOBRA 21ADH (manufactured by Oji Scientific Instruments). Further, Rth was calculated by entering an assumed value of an average refractive index, 1.48, and a film thickness, based on three retardation values measured in three directions, that is, Re described above, a retardation value measured by allowing light having a wavelength of 590 nm to be incident from a direction inclined at +40° to the normal line direction of the film, taking a slow axis in a plane as an inclined axis, and a retardation value measured by allowing light having a wavelength of 590 nm to be incident from a direction inclined at −40° to the normal line direction of the film, taking a slow axis in a plane as an inclined axis.
(Water Content)

Using a sample of 7 mm×35 mm, measurements were made by the Karl Fischer method with a water content measuring instrument and sample dryers (CA-03 and VA-05, both manufactured by Mitsubishi Chemical Corporation). The water content was calculate by dividing the amount of water (g) by the weight of the sample (g).
(Degree of Heat Shrinkage)

A sample of 30 mm×120 mm was aged at 90° C. and 5% RH for 24 hours or 120 hours. Openings 6 mm in diameter were formed at both ends of the sample at an interval of 100 mm with an automatic pin gauge (manufactured by Shinto Scientific Co., Ltd.), and the original size of the distance (L1) was measured to a minimum scale value of 1/1000 mm. Further, the sample was allowed to stand at 60° C. and 95% RH or 90° C. and 5% RH for 24 hours, and the size of the punch distance (L2) was measured. Then, degree of heat shrinkage was determined by $\{(L1-L2)/L1\} \times 100$.
(Glass Transition Point Tg)

A film sample (unstretched) of 5 mm×30 mm was moisture-conditioned at 25° C. and 60% RH for 2 hours or more, and then, measurements were made with a dynamic viscoelasticity measuring device (Vibron: DVA-225, manufactured by IT Keisoku Seigyo Co., Ltd.) at a distance between clamps of 20 mm, a rate of temperature rise of 2° C./min, the range of temperatures to be measured of 30 to 200° C. and a frequency of 1 Hz. When the storage modulus was plotted on a logarithmic axis as ordinate, and the temperature on a linear axis as abscissa, line 1 was drawn in a solid region at a rapid decrease in storage modulus observed when the storage modulus was shifted from the solid region to a glass transition region, and line 2 was drawn in the glass transition region. The intersection of line 1 and line 2 indicates a temperature at which the storage modulus rapidly decreases at the time of temperature rise, and the film starts to be softened and starts to be shifted to the glass transition region. This was therefore taken as the glass transition temperature Tg (dynamic viscoelasticity).
(Elastic Modulus)

A sample of 10 mm×200 mm was moisture-conditioned at 25° C. and 60% H for 2 hours, and measurements were made with a tensile tester (Strograph R2 manufactured by Toyo Seiki Seisaku-Sho Ltd.) at an initial sample length of 100 mm and a tensile speed of 100 mm/min. The elastic modulus was calculated from the stress and strain at initial stretching.
(Photoelastic Coefficient)

The tensile stress was applied longitudinally to a film sample of 10 mm×100 mm, and the Re retardation at that time was measured with an ellipsometer (M150, manufactured by JASCO Corporation). The photoelastic coefficient was calculated from the variation of the retardation to the stress.
(Haze)

For a film sample of 40 mm×80 mm, measurements were made at 25° C. and 60% RH with a haze meter (HGM-2DP, manufactured by Suga Test Instruments Co., Ltd.) according to JIS K6714.

Example 1

1. Formation of Cellulose Acylate Films (1) Cellulose Acylates

Cellulose acylates described in Table 1, which are different in the degree of acetyl substitution, were prepared. Acylation reaction was conducted at 40° C. by adding sulfuric acid (7.8 parts by weight based on 100 parts by weight of cellulose) as a catalyst, and adding a carboxylic acid. Then, the amount of the sulfuric acid catalyst, the amount of water and the ageing time were adjusted to adjust the total degree of substitution and the degree of substitution at the 6-position. The ageing temperature was 40° C. Further, low molecular weight components of this cellulose acylate were removed by washing with acetone.

(2) Preparation of Chlorine-Based Organic Solvent Dopes

Each of the cellulose acylates described in Table 1 and a plasticizer (a 2:1 mixture of triphenyl phosphate and biphenyldihenyl phosphate) were put into a mixed solvent of dichloromethane/methanol (87/13 parts by weight) with stirring to yield a solid content of 19% by weight, and dissolved by stirring under heating. At this time, fine particles (silicon dioxide (having a primary particle size of 20 nm), Mohs hardness: about 7) were concurrently added in an amount of 0.05 part by weight, based on 100 parts by weight of cellulose acylate, and stirred with heating. The amount of the plasticizer added is 11.5 parts by weight based on 100 parts by weight of cellulose acylate. From dopes thus prepared, films of Example F1 and Comparative Examples F2 and F3 were prepared by the following method.

(3) Preparation of Non-Chlorine-Based Organic Solvent Dopes

Each of the cellulose acylates described in Table 1 and a plasticizer (a 2:1 mixture of triphenyl phosphate and biphenyldihenyl phosphate) were put into a mixed solvent of methyl acetate/acetone/ethanol/butanol (81/8/7/4 parts by weight) with stirring to yield a solid content of 16.4% by weight, and swelled by stirring. At this time, the plasticizer, fine particles (silicon dioxide (having a primary particle size of 20 nm), Mohs hardness: about 7) and ethyl citrate (a 1:1 mixture of a monoester and a diester) were concurrently added in amounts of 12 parts by weight, 0.05 part by weight and 0.04 part by weight, respectively, based on 100 parts by weight of cellulose acylate, with stirring. After cooled to −70° C., a swelled liquid was heated, and dissolved at 40° C. The resulting dope was filtered, and then flash-concentrated at a temperature of 120° C. to adjust the concentration of solid matter in the dope to about 21%. From dopes thus prepared, films of Examples F4 to F7 and Comparative Example F8 were prepared by the following method.

(Casting and Stretching)

The above-mentioned dopes were cast using a band casting apparatus. Films were separated from a band at a residual solvent amount of 25 to 35% by weight. For F1 to F4 and F8, the films separated from the band were stretched 1.35 times in the MD using a tenter, and then, contracted 0.05 time. Accordingly, taking the film width at an entrance of the tenter as 100, the film width at an outlet of the tenter was 130. For F5, the film separated from the band was stretched 1.2 times in the casting direction by adjusting the distance between rolls to 0.2 to 0.4 m. Contraction in the width direction was slight. For F6, the film separated from the band was stretched 1.2 times in the casting direction by adjusting the distance between rolls to 1 to 2 m. After completion of stretching, the width of the film was contracted to 0.93 times the original one. For F7, the separated film was dried until the residual solvent amount was decreased to 0.5% or less, and then, concurrently biaxially stretched 1.3 times in the MD and 1.05 times in the TD with hot air at 160° C., using a long stretching machine.

TABLE 1

| Film No. | Degree of Acetyl Substitution | Degree of Propionyl Substitution | Solvent System | Stretching Ratio MD | Stretching Ratio TD | Film Thickness after Drying (μm) |
|---|---|---|---|---|---|---|
| F1 | 2.55 | 0.00 | Methylene Chloride | — | 1.3 | 140 |
| F2 | 2.86 | 0.00 | Methylene Chloride | — | 1.3 | 140 |
| F3 | 2.79 | 0.00 | Methylene Chloride | — | 1.3 | 80 |
| F4 | 1.95 | 0.81 | Methyl Acetate | — | 1.3 | 126 |
| F5 | 2.79 | 0.00 | Methyl Acetate | 1.2 | — | 140 |
| F6 | 2.79 | 0.00 | Methyl Acetate | 1.4 | 0.93 | 125 |
| F7 | 2.55 | 0.00 | Methyl Acetate | 1.3 | 1.05 | 98 |
| F8 | 2.79 | 0.00 | Methyl Acetate | — | 1.3 | 80 |

| Film No. | Re (nm) | Rth (nm) | a (nm) | VA Cell Characteristic And (nm) | Viewing Angle Which Can Keep a Contrast Ratio of 20 or More | Note |
|---|---|---|---|---|---|---|
| F1 | 55 | 277 | 602 | 300 | >80 | Invention |
| F2 | 8 | 172 | 219 | 300 | <50 | Comparison |
| F3 | 18 | 118 | 224 | 300 | <50 | Comparison |
| F4 | 58 | 256 | 598 | 350 | >80 | Invention |
| F5 | 60 | 282 | 636 | 350 | >80 | Invention |
| F6 | 60 | 185 | 539 | 300 | >80 | Invention |

TABLE 1-continued

| | | | | | | |
|---|---|---|---|---|---|---|
| F7 | 65 | 245 | 629 | 300 | >80 | Invention |
| F8 | 26 | 149 | 302 | 300 | <50 | Comparison |

In all the films prepared, the glass transition temperature was between 138° C. to 147° C., and the water content after moisture conditioning at 25° C. and 80% RH was between 2.9 to 3.3%. Further, in all these films, the haze was from 0.1 to 0.9, the average secondary particle size of the matte agent was 1.0 μm or less, the tensile elastic modulus was 3.5 GPa or more, and the weight change at the time when the film was allowed to stand under conditions of 80° C. and 90% RH for 48 hours was from 0 to 4.5%. Furthermore, the dimensional change at the time when the film was allowed to stand under conditions of 60° C. and 95% RH and under conditions of 90° C. and 5% RH for 24 hours was from 0 to 4.5%. In addition, all samples had a photoelastic coefficient of $50 \times 10^{-13}$ cm$^2$/dyne or less, and satisfied $0.80 \leq Re_{(450)}/Re_{(550)} \leq 1.00$, $1.00 \leq Re_{(650)}/Re_{(550)} \leq 1.20$, $0.90 \leq Rth_{(450)}/Rth_{(550)} \leq 1.00$ and $1.00 \leq Rth_{(650)}/Rth_{(550)} \leq 1.10$.

Example 2

<2-1-1>
(Preparation of Polarizing Plates-1)

Iodine was allowed to be adsorbed by a stretched polyvinyl alcohol film to prepare a polarizer.

Each of the cellulose acylate films prepared in Example 1 (F1 to F8: corresponding to TAC 1 of FIGS. 1 and 2 or TAC 1-1 or 1-2 of FIG. 3) was subjected to saponification treatment, and was bonded to one side of the polarizer with a polyvinyl alcohol-based adhesive. Saponification treatment was performed under the following conditions.

A 1.5 N sodium hydroxide aqueous solution was prepared and kept warm at 55° C. A 0.01 N diluted sulfuric acid aqueous solution was prepared and kept warm at 35° C. The cellulose acylate film prepared was immersed in the above-mentioned sodium hydroxide aqueous solution for 2 minutes, and then, immersed in water to thoroughly wash away the sodium hydroxide aqueous solution. Then, the film was immersed in the above-mentioned diluted sulfuric acid aqueous solution for 1 minute, and then, immersed in water to thoroughly wash away the diluted sulfuric acid aqueous solution. Finally, the sample was sufficiently dried at 120° C.

Figure 2:
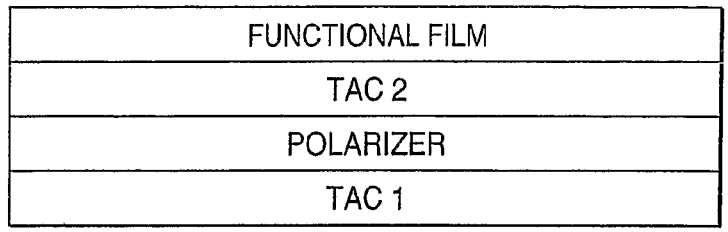
FIG. 2 is a cross sectional view schematically showing a cross-sectional structure of an illustrative, non-limiting embodiment of a polarizing plate of the invention.
Figure 3:
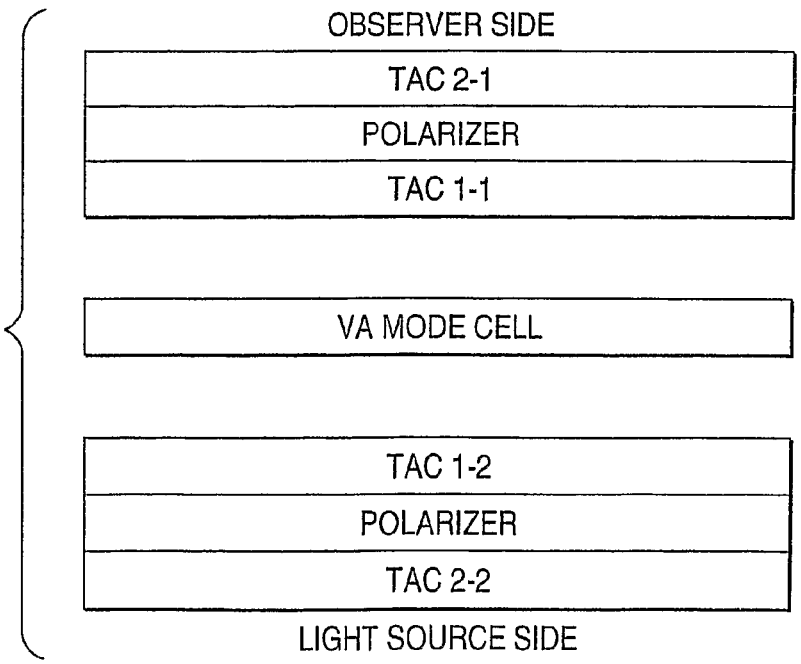
FIG. 3 is a cross sectional view schematically showing a cross-sectional structure of an illustrative, non-limiting embodiment of a liquid crystal display of the invention.

A commercially available cellulose acylate film (Fujitac TD80UF, manufactured by Fuji Photo Film Co., Ltd.: corresponding to functional film TAC 2 of FIG. 2 and TAC 2-1 or 2-2 of FIG. 3) was subjected to saponification treatment, and bonded to the other side of the polarizer with the polyvinyl alcohol-based adhesive, followed by drying at 70° C. for 10 minutes.

A polarizing plate was prepared such that a transmission axis of the polarizer and a slow axis of each cellulose acylate film prepared in Example 1 were arranged so as to be in parallel with each other (FIG. 1), and the transmission axis of the polarizer and a slow axis of the commercially available cellulose acylate film were arranged so as to be perpendicular to each other.

Using a spectrophotometer (UV3100PC), the single plate transmittance (TT), parallel transmittance (PT) and cross transmittance (CT) of the prepared polarizing plate at 380 nm to 780 nm at 25° C. and 60% RH were measured, in which two polarizing plates were combined so that each cellulose acylate film prepared in Example 1 was positioned inside the polarizer. Then, the average value at 400 to 700 nm and the polarization degree (P) were determined. As a result, TT was from 40.8 to 44.7, PT was from 34 to 38.8, CT was 1.0 or less, and P was from 99.98 to 99.99. Further, the cross transmittances $CT_{(380)}$, $CT_{(410)}$ and $CT_{(700)}$ at wavelengths of 380 nm, 410 nm and 700 nm were 1.0 or less, 0.5 or less and 0.3 or less, respectively. Furthermore, in the polarizing plate durability test at 60° C. and 95% RH for 500 hours, all were within the ranges of $-0.1 \leq \Delta CT \leq 2.0$ and $-2.0 \leq \Delta P \leq 0$. In the test at 60° C. and 90% RH, all were within the ranges of $-0.05 \leq \Delta CT \leq 0.15$ and $-1.5 \leq \Delta P \leq 0$.

Each of the polarizing plates A1 to A8 thus prepared (an optical compensating film integral type polarizing plate having no functional film in FIG. 2) was partly put into a moisture-proofed bag as it is and stored, and further partly put into a moisture-proofed bag after moisture conditioning at 25° C. and 60% RH for 2 hours and stored. The moisture-proofed bag was made of a packaging material having a laminated structure of polyethylene terephthalate/aluminum/polyethylene, and had a moisture permeability of 0.01 mg/m$^2$ (24 hours) or less.

(Preparation of Light Scattering Layer Coating Solution)

Fifty grams of a mixture of pentaerythritol triacrylate and pentaerythritol tetraacrylate (PETA, manufactured by Nippon Kayaku Co., Ltd.) was diluted with 38.5 g of toluene. Further, 2 g of a polymerization initiator (Irgacure 184, manufactured by Ciba Specialty Chemicals Inc.) was added thereto, followed by mixing and stirring. The resulting solution was applied and cured with ultraviolet light to obtain a coating film. The refractive index thereof was 1.51.

Further, 1.7 g of a 30% toluene dispersion of crosslinked polystyrene particles having an average particle size of 3.5 μm (refractive index: 1.60, SX-350, manufactured by Soken Chemical & Engineering Co., Ltd.) dispersed at 10,000 rpm for 20 minutes with a Polytron homogenizer, and 13.3 g of a 30% toluene dispersion of crosslinked acrylic-styrene particles having an average particle size of 3.5 μm (refractive index: 1.55, manufactured by Soken Chemical & Engineering Co., Ltd.) were added to this solution, and finally, 0.75 g of a fluorine-based surface modifier (FP-1) and 10 g of a silane coupling agent (KBM-5103, manufactured by Shin-Etsu Chemical Co., Ltd.) were added to prepare a completed solution.

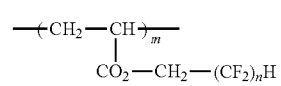

FP-1 m is about 36, and n is 6.

The above-mentioned mixed solution was filtered through a polypropylene filter having a pore size of 30 μm to prepare a light scattering layer coating solution.

<2-2-2>
(Preparation of Lower Refractive Index Layer Coating Solution)

First, a sol solution a was prepared in the following manner. Into a reactor equipped with a stirrer and a reflux condenser, 120 parts of methyl ethyl ketone, 100 parts of acryloyloxypropyltrimethoxysilane (KBM-5103, manufactured by Shin-Etsu Chemical Co., Ltd.) and 3 parts of diisopropoxyaluminum ethyl acetoacetate were put and mixed. Then, 30 parts of ion exchange water was added thereto, and reaction was conducted at 60° C. for 4 hours, followed by cooling to room temperature to obtain the sol solution a. The weight average molecular weight was 1600, and of oligomer and polymer components, components having a molecular weight of 1,000 to 20,000 were 100%. Further, from gas chromatography analysis, no acryloyl-oxypropyltrimethoxysilane of the raw material remained at all.

Then, 13 g of heat crosslinkable fluorine-containing polymer (JN-7228, solid content: 6%, manufactured by JSR Corporation), 1.3 g of a silica sol (silica, MEK-ST of different particle size, average particle size: 45 nm, solid content: 30%, manufactured by Nissan Chemical Industries, Ltd.), 0.6 g of the above-mentioned sol solution a, and 0.6 g of cyclohexanone were added and stirred, followed by filtration through a polypropylene filter having a pore size of 1 µm to prepare a lower refractive index layer coating solution.

<2-2-3>
(Preparation of Transparent Protective Film 01 with Light Scattering Layer)

An 80-µm thick triacetyl cellulose film (Fujitac TD80UF, manufactured by Fuji Photo Film Co., Ltd.) in a roll form was wound off, and coated with the above-mentioned functional layer (light scattering layer) coating, solution using a 50-mm diameter microgravure roll having a gravure pattern of a line number of 180 lines/inch and a depth of 40 µm and a doctor blade, under conditions of a gravure roll revolution of 30 rpm and a conveying speed of 30 m/min. After dried at 60° C. for 150 seconds, it was irradiated with ultraviolet light at an illuminance of 400 mW/cm$^2$ and a dose of 250 mJ/cm$^2$, using a 160-W/cm air-cooled metal halide lamp (manufactured by Eyegraphics Co., Ltd.) under nitrogen purge to cure the coated layer. Thus, a 6-µm thick functional layer was formed and taken up.

The triacetyl cellulose film provided with the functional layer (light scattering layer) was wound off again, and coated on the light scattering layer side thereof with the lower refractive index layer coating solution prepared above, using a 50-mm diameter microgravure roll having a gravure pattern of a line number of 180 lines/inch and a depth of 40 µm and a doctor blade, under conditions of a gravure roll revolution of 30 rpm and a conveying speed of 15 m/min, followed by drying at 120° C. for 150 seconds. After further drying at 140° C. for 8 minutes, ultraviolet light was irradiated at an illuminance of 400 mW/cm$^2$ and a dose of 900 mJ/cm$^2$, using a 240-W/cm air-cooled metal halide lamp (manufactured by Eyegraphics Co., Ltd.) under nitrogen purge. Thus, a 100-nm thick lower refractive index layer was formed and taken up (corresponding to functional film TAC 2 of FIG. 2 or TAC 2-1 of FIG. 3).

(Preparation of Polarizing Plate-2)

Iodine was allowed to be adsorbed by a stretched polyvinyl alcohol film to prepare a polarizer.

The prepared transparent protective film 01 with the light scattering layer was subjected to the same saponification treatment as described in <2-1-1>, and a side thereof on which no functional film was provided was bonded to one side of the polarizer with a polyvinyl alcohol-based adhesive. Each of the cellulose acylate films prepared in Example 1 (F1 to F8: corresponding to TAC 1 of FIGS. 1 and 2 or TAC 1-1 or 1-2 of FIG. 3) was subjected to similar saponification treatment, and bonded to the opposite side of the polarizer with the polyvinyl alcohol-based adhesive, followed by drying at 70° C. for 10 minutes or more (a structure of FIG. 2 was completed).

A transmission axis of the polarizer and a slow axis of each cellulose acylate film prepared in Example 1 were arranged so as to be in parallel with each other (FIG. 1). The transmission axis of the polarizer and a slow axis of the transparent protective film with the light scattering layer were arranged so as to be perpendicular to each other. Thus, polarizing plates (B1 to B8: functional film-optical compensating film integral type polarizing plates (FIG. 2)) were prepared. In the same manner as described in "Preparation of Polarizing Plates"<2-1-1>, there were prepared one put into a moisture-proofed bag after moisture conditioning at 25° C. and 60% RH for 2 hours and one put into a moisture-proofed bag without moisture conditioning.

Iodine was allowed to be adsorbed by a stretched polyvinyl alcohol film to prepare a polarizer. The transparent protective film 01 with the light scattering layer prepared in <2-2-3> and an 80-µm thick triacetyl cellulose film (Fujitac TD80UF, manufactured by Fuji Photo Film Co., Ltd.) which was coated with no functional layer were subjected to the same saponification treatment as described above, and bonded to the polarizer with the polyvinyl alcohol-based adhesive in the same manner as described above. Thus, a polarizing plate (B0: a functional film-optical compensating film integral type polarizing plate (FIG. 2)) was prepared. In the same manner as described in "Preparation of Polarizing Plates"<2-1-1>, there were prepared one put into a moisture-proofed bag after moisture conditioning and one put into a moisture-proofed bag without moisture conditioning.

Using a spectrophotometer (manufactured by JASCO Corporation), the spectral reflectance at an incident angle of 5° within the wavelength range of 380 to 780 nm was measured from the functional film side to determine the integrating sphere average reflectance at 450 to 650 nm. As a result, it was 2.3% for each of polarizing plates B1 to B8.

<2-4-1>
(Preparation of Hard Coat Layer Coating Solution)

To 750.0 parts by weight of trimethylolpropane triacrylate (TMPTA, manufactured by Nippon Kayaku Co., Ltd.), there were added 270.0 parts by weight of poly(glycidyl methacrylate) having a weight average molecular weight of 3,000, 730.0 g of methyl ethyl ketone, 500.0 g of cyclohexanone and 50.0 g of a photopolymerization initiator (Irgacure 184, manufactured by Ciba Specialty Chemicals Inc.), followed by stirring. The resulting solution was filtered through a polypropylene filter having a pore size of 0.4 µm to prepare a hard coat layer coating solution.

(Preparation of Fine Titanium Oxide Particle Dispersion)

As fine titanium oxide particles, there were used fine titanium oxide particles containing cobalt and surface-treated with aluminum hydroxide and zirconium hydroxide (MPT-129, manufactured by Ishihara Sangyo Co., Ltd.).

To 257.1 g of the particles, there were added 38.6 g of the following dispersing agent and 704.3 g of cyclohexanone, followed by dispersion with a Dynomill to prepare a titanium oxide dispersion having a weight average size of 70 nm.

Dispersing Agent

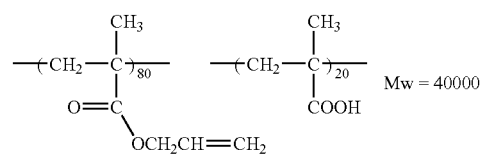

<2-4-3>
(Preparation of Medium Refractive Layer Coating Solution)

To 88.9 g of the above-mentioned titanium oxide dispersion, there were added 58.4 g of a mixture (DPHA) of dipentaerythritol pentaacrylate and dipentaerythritol hexaacrylate, 3.1 g of a photopolymerization initiator (Irgacure 907), 1.1 g of a photosensitizer (Kayacure DETX, manufactured by Nippon Kayaku Co., Ltd.), 482.4 g of methyl ethyl ketone and 1869.8 g of cyclohexanone, followed by stirring. After thoroughly stirred, the resulting solution was filtered through a polypropylene filter having a pore size of 0.4 μm to prepare a medium refractive index layer coating solution.

<2-4-4>
(Preparation of Higher refractive Index Layer Coating Solution)

To 586.8 g of the above-mentioned titanium oxide dispersion, there were added 47.9 g of a mixture (DPHA, manufactured by Nippon Kayaku Co., Ltd.) of dipentaerythritol pentaacrylate and dipentaerythritol hexaacrylate, 4.0 g of a photopolymerization initiator (Irgacure 907, manufactured by Ciba Specialty Chemicals Inc.), 1.3 g of a photosensitizer (Kayacure DETX, manufactured by Nippon Kayaku Co., Ltd.), 455.8 g of methyl ethyl ketone and 1427.8 g of cyclohexanone, followed by stirring. After thoroughly stirred, the resulting solution was filtered through a polypropylene filter having a pore size of 0.4 μm to prepare a higher refractive index layer coating solution.

<2-4-5>
(Preparation of Lower Refractive Index Layer Coating Solution)

A copolymer represented by the following formula was dissolved in methyl isobutyl ketone to a concentration of 7% by weight. A terminal methacrylate group-containing silicone resin X-22-164C (manufactured by Shin-Etsu Chemical Co., Ltd.) was added in an amount of 3% based on solid matter, and a photopolymerization initiator Irgacure 907 (trade name) was added in an amount of 5% by weight based on solid matter to prepare a lower refractive index layer coating solution.

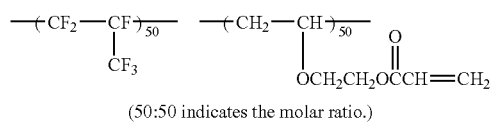

(50:50 indicates the molar ratio.)

<2-4-6>
(Preparation of Transparent Protective Film 02 with Antireflective Layer)

An 80-μm thick triacetyl cellulose film (Fujitac TD80UF, manufactured by Fuji Photo Film Co., Ltd.) was coated with the hard coat layer coating solution using a gravure coater. After dried at 100° C., it was irradiated with ultraviolet light at an illuminance of 400 mW/cm$^2$ and a dose of 300 mJ/cm$^2$, using a 160-W/cm air-cooled metal halide lamp (manufactured by Eyegraphics Co., Ltd.), while purging the atmosphere with nitrogen to an oxygen concentration of 1.0% by volume or less, thereby curing the coated layer. Thus, an 8-μm thick hard coat layer was formed.

The medium refractive index layer coating solution, the higher refractive index layer coating solution and the lower refractive index layer coating solution were continuously applied onto the hard coat layer using a gravure coater having three coating stations.

The medium refractive index layer was dried at 100° C. for 2 minutes, and irradiated with ultraviolet light at an illuminance of 400 mW/cm$^2$ and a dose of 400 mJ/cm$^2$, using a 180-W/cm air-cooled metal halide lamp (manufactured by Eyegraphics Co., Ltd.), while purging the atmosphere with nitrogen to an oxygen concentration of 1.0% by volume or less. The medium refractive index layer cured had a refractive index of 1.630 and a film thickness of 67 nm.

Both the higher refractive index layer and the lower refractive index layer were dried at 90° C. for 1 minute and further at 100° C. for 1 minute, and irradiated with ultraviolet light at an illuminance of 600 mW/cm$^2$ and a dose of 600 mJ/cm$^2$, using a 240-W/cm air-cooled metal halide lamp (manufactured by Eyegraphics Co., Ltd.), while purging the atmosphere with nitrogen to an oxygen concentration of 1.0% by volume or less.

The higher refractive index layer cured had a refractive index of 1.905 and a film thickness of 107 nm, and the lower refractive index layer cured had a refractive index of 1.440 and a film thickness of 85 nm. Thus, a transparent protective film 02 with a reflective layer was prepared (corresponding to functional film TAC 2 of FIG. 2 or TAC 2-1 of FIG. 3).

(Preparation of Polarizing Plate-3 )

Polarizing plates (C1 to C8: functional film-optical compensating film integral type polarizing plates (FIG. 2)) were prepared in the same manner as with <2-3-1> with the exception that the transparent protective film 02 with the reflective layer was used in place of the transparent protective layer 01 with the light scattering layer. Further, a polarizing plate (CO) comprising the transparent protective film 02 with the reflective layer, the polarizer and the 80-μm thick triacetyl cellulose film (Fujitac TD80UF, manufactured by Fuji Photo Film Co., Ltd.) which was coated with no functional layer was prepared in the same manner.

Using a spectrophotometer (manufactured by JASCO Corporation), the spectral reflectance at an incident angle of 5° within the wavelength range of 380 to 780 nm was measured from the functional film side to determine the integrating sphere average reflectance at 450 to 650 nm. As a result, it was 0.4% for each of polarizing plates C1 to C8.

Example 3

(Mounting to VA Panel)(One Sheet Type)

A liquid crystal display of FIG. 3 was prepared. That is to say, an upper polarizing plate (TAC 2-1 (having a functional film/no functional film), a polarizer and TAC 1-1), a VA mode liquid crystal cell and a lower polarizing plate (TAC 1-2, a polarizer and TAC 2-2) were laminated from the observer side (upper side), and a back light source was arranged. In the following example, a commercially available polarizing plate (HLC2-5618) was used as the upper polarizing plate, and a polarizing plate formed integrally with an optical compensating film was used as the lower polarizing plate. However, even when this arrangement is reversed, there is no problem functionally. The integral type polarizing plate is preferably used as the lower polarizing plate (because when it is used as the upper polarizing plate, it is necessary to provide the functional film on the observer side (upper side), which may cause a decrease in production yield ratio), and this is considered to be more preferred embodiment.

<Preparation of Liquid Crystal Cell>

The liquid crystal cell was prepared by dropping and injecting a liquid crystal material having negative dielectric constant anisotropy (MLC6608, manufactured by Merck & Co., Inc.) between substrates, and sealing it to form a liquid crystal layer between the substrates. The retardation of the liquid crystal layer (that is to say, the product Δn·d of the thickness d (μm) of the liquid crystal layer and the refractive index anisotropy Δn) was adjusted to 300 to 350 nm, and properly used depending on the characteristics of the optical film of the invention. The Δn·d values of the liquid crystal cells used are shown in Table 1. The liquid crystal material was vertically orientated.

Example 3-1

Comparative Example 3-1

A commercially available super high contrast product (for example, HLC2-5618 manufactured by Sanritz Corporation) was used as the upper polarizing plate (on the observer side) of the liquid crystal display (FIG. 3) in which the above-mentioned vertically orientated liquid crystal cell was used. As the lower polarizing plate (on the back light side), there was disposed each of the polarizing plates (A1 to A8) prepared in <2-1-1> of Example 2 using each of the optical compensating sheets (F1 to F8) prepared in Example 1 so that the cellulose acylate film (corresponding to TAC 1-2 of FIG. 3) prepared in Example 1 was disposed on the liquid crystal cell side. The upper polarizing plate and the lower polarizing plate were bonded to the crystal cell through an adhesive. A cross nicol arrangement was employed so that the transmission axis of the upper polarizing plate was arranged in the up-and-down direction and the transmission axis of the lower polarizing plate was arranged from side to side. Both the polarizing plate previously moisture conditioned under temperature and humidity conditions of 25° C. and 60% RH for 2 hours and sealed in the moisture-proofed bag to be stored and the polarizing plate sealed in the bag without moisture conditioning to be stored were each used to prepare the liquid crystal displays, respectively.

In this example, the commercially available product was used as the upper polarizing plate, and the integral type polarizing plate of the invention was used as the lower polarizing plate. However, as a result of observation of the liquid crystal display prepared, a neutral black indication could be realized also in the front direction and viewing angle direction. Further, using a measuring instrument (EZ-Contrast 160D, manufactured by ELDIM SA), the viewing angle (within the range in which the contrast ratio is 20 or more and no tone reversal on the black side occurs) was measured at 8 stages of a black indication (L1) to a white indication (L8).

Then, the color on the black indication in a direction at an azimuth angle of 45° based on the lateral direction of a liquid crystal screen and a polar angle of 60° based on the normal direction was measured using the measuring instrument EZ-Contrast 160D, manufactured by ELDIM SA), and this was taken as an initial value. Then, this panel was allowed to stand in a room of ordinary temperature and humidity (approximately 25° C. and 60% RH without humidity control) for 1 week, and the color on the black indication was measured again.

The measurement results of the viewing angle and changes in color are shown in Table 2 described below.

All the liquid crystal displays of the invention provided with the polarizing plates A1 and A4 to A7, respectively, using the films F1 and F4 to F7 of the invention, respectively, had a wide viewing angle and also small changes in color. All the liquid crystal displays for comparison provided with the polarizing plates A2, A3 and A8, respectively, using the films F2, F3 and F8 for comparison, respectively, had a narrow viewing angle.

The liquid crystal displays of the invention in which the polarizing plates had been moisture conditioned before fabrication thereof had particularly small changes in color.

Example 3-2

Comparative Example 3-2

Each of the polarizing plates (A1 to A8) prepared in <2-1-1> of Example 2 using each of the optical compensating sheets (F1 to F8) prepared in Example 1 was bonded to the lower polarizing plate of the liquid crystal display (FIG. 3) in which the above-mentioned vertically orientated liquid crystal cell was used, and the polarizing plate (B0) prepared in <2-3-1> of Example 2 was bonded to the upper polarizing plate, through an adhesive. A cross nicol arrangement was employed so that the transmission axis of the polarizing plate on the observer side was arranged in the up-and-down direction and the transmission axis of the polarizing plate on the back light side was arranged from side to side. At this time, a work room was air conditioned to a temperature of 20 to 25° C. and a humidity of 50 to 70% RH. Both the polarizing plate previously moisture conditioned under temperature and humidity conditions of 25° C. and 60% RH for 2 hours and sealed in the moisture-proofed bag to be stored and the polarizing plate sealed in the bag without moisture conditioning to be stored were each used to prepare the liquid crystal displays, respectively.

As a result of observation of the liquid crystal displays prepared, a neutral black indication could be realized also in the front direction and viewing angle direction. Further, the viewing angle and changes in color were measured in the same manner as with Example 3-1. The results thereof are shown in Table 2.

All the liquid crystal displays of the invention provided with the polarizing plates A1 and A4 to A7, respectively, using the films F1 and F4 to F7 of the invention, respectively, had a wide viewing angle and also small changes in color. All the liquid crystal displays for comparison provided with the polarizing plates A2, A3 and A8, respectively, using the films F2, F3 and F8 for comparison, respectively, had a narrow viewing angle.

The liquid crystal displays of the invention in which the polarizing plates had been moisture conditioned before fabrication thereof had particularly small changes in color.

Example 3-3

Comparative Example 3-3

Each of the polarizing plates (A1 to A8) prepared in <2-1-1> of Example 2 using each of the optical compensating sheets (F1 to F8) prepared in Example 1 was bonded to the lower polarizing plate of the liquid crystal display (FIG. 3) in which the above-mentioned vertically orientated liquid crystal cell was used, and the polarizing plate (C0) prepared in <2-5-1> of Example 2 was bonded to the upper polarizing plate, through an adhesive. A cross nicol arrangement was employed so that the transmission axis of the polarizing plate on the observer side was arranged in the up-and-down direction and the transmission axis of the polarizing plate on the back light side was arranged from side to side. At this time, a work room was air conditioned to a temperature of 20 to 25° C. and a humidity of 50 to 70% RH. Both the polarizing plate previously moisture conditioned under temperature and humidity conditions of 25° C. and 60% RH for 2 hours and sealed in the moisture-proofed bag to be stored and the polarizing plate sealed in the bag without moisture conditioning to be stored were each used to prepare the liquid crystal displays, respectively.

As a result of observation of the liquid crystal displays prepared, a neutral black indication could be realized also in the front direction and viewing angle direction. Further, the viewing angle and changes in color were measured in the same manner as with Example 3-1. The results thereof are shown in Table 2.

All the liquid crystal displays of the invention provided with the polarizing plates A1 and A4 to A7, respectively, using the films F1 and F4 to F7 of the invention, respectively, had a wide viewing angle and also small changes in color. All the liquid crystal displays for comparison provided with the polarizing plates A2, A3 and A8, respectively, using the films F2, F3 and F8 for comparison, respectively, had a narrow viewing angle.

The liquid crystal displays of the invention in which the polarizing plates had been moisture conditioned before fabrication thereof had particularly small changes in color.

TABLE 2

| Liquid Crystal Display | Viewing Angle | | Changes in Black Color 1 Week after Fabrication (ΔE*) |
|---|---|---|---|
| | Transmission Axis Direction | Direction at 45° from Transmission Axis | |
| Example 3-1 | >80° | >80° | Not moisture conditioned: 0.010-0.013 Moisture conditioned: 0.002 |
| Example 3-2 | " | " | Not moisture conditioned: 0.010-0.013 Moisture conditioned: 0.002 |
| Example 3-3 | " | " | Not moisture conditioned: 0.010-0.013 Moisture conditioned: 0.002 |
| Comparative Example 3-1 | <50° | <50° | Not moisture conditioned: 0.020-0.032 |
| Comparative Example 3-2 | " | " | " |
| Comparative Example 3-3 | " | " | " |

Industrial Applicability

A VA mode liquid crystal display of the invention has narrow fluctuations in retardation value with environmental humidity and small changes in viewing angle characteristics.

It will be apparent to those skilled in the art that various modifications and variations can be made to the described preferred embodiments of the invention without departing from the spirit or scope of the invention. Thus, it is intended that the present invention cover all modifications and variations of this invention consistent with the scope of the appended claims and their equivalents.

The present application claims foreign priority based on Japanese Patent Application No. JP2004-191075 filed Jun. 29 of 2004, the contents of which is incorporated herein by reference.

The invention claimed is:

1. A liquid crystal display comprising: a liquid crystal cell of VA mode; and a polarizing plate, the polarizing plate comprising: a polarizer; and a protective film comprising a cellulose acylate film having a thickness of 40 to 180 μm and containing no retardation increasing agent, wherein the cellulose acylate film has a retardation value Re in a film plane thereof and a retardation value Rth in a direction perpendicular to the film plane, the retardation values Re and Rth being defined by formula (I) and (II), respectively, and the retardation values Re and Rth measured at 25° C. and 60% RH satisfy formula (III) to (V):

$$Re=(nx-ny)\times d \quad (I)$$

$$Rth=\{(nx+ny)/2-nz\}\times d \quad (II)$$

$$46 \leq Re \leq 100 \quad (III)$$

$$Rth=a-5.9Re \quad (IV)$$

$$520 \leq a \leq 670 \quad (V)$$

wherein the retardation values Re and Rth are values by nm at a wavelength of 590 nm, nx is a refractive index in a slow axis direction in the film plane, ny is a refractive index in a fast axis direction in the film plane, nz is a refractive index in the direction perpendicular to the film plane, and d is a thickness by nm of the cellulose acylate film, wherein retardation values Re (λ) and Rth (λ) measured at 25° C. and 60% RH, which are the retardation values Re and Rth at a wavelength of λ nm, respectively, satisfy relations (A) and (B):

$$0.80 \leq Re_{(450)}/Re_{(550)} \leq 1.00 \quad \text{and} \quad 1.00 \leq Re_{(650)}/Re_{(550)} \leq 1.20 \quad (A)$$

$$0.90 \leq Rth_{(450)}/Rth_{(550)} \leq 1.00 \quad \text{and} \quad 1.00 \leq Rth_{(650)}/Rth_{(550)} \leq 1.10 \quad (B),$$

wherein the polarizing plate satisfies at least one of formulae (j) and (k):

$$-6.0 \leq \Delta CT \leq 6.0 \quad (j)$$

$$-10.0 \leq \Delta P \leq 0.0 \quad (k)$$

wherein ΔCT and ΔP represents a change in cross transmittance and polarization degree, respectively, in a test that the polarizing plate is allowed to stand at 60° C. and 95% RH for 500 hours; and the change means a value calculated by subtracting a measurement value before the test from a measurement value after the test.

2. The liquid crystal display according to claim 1, wherein the cellulose acylate film comprises a mixed fatty acid ester of cellulose, wherein a hydroxyl group of the cellulose is substituted by an acetyl group, another hydroxyl group of the cellulose is substituted by an acyl group having 3 or more carbon atoms, and the cellulose satisfies formula (VI):

$$2.00 \leq A+B \leq 2.85$$

wherein A is a degree of substitution by the acetyl group, and B is a degree of substitution by the acyl group having 3 or more carbon atoms.

3. The liquid crystal display according to claim 2, wherein the B is more than 0.6.

4. The liquid crystal display according to claim 1, wherein the cellulose acylate film comprises at least one of a plasticizer, an ultraviolet absorber and a release accelerator.

5. The liquid crystal display according to claim 1, wherein the polarizing plate satisfies at least one of formulae (a) to (d):

$$40.0 \leq TT \leq 45.0 \tag{a}$$

$$30.0 \leq PT \leq 40.0 \tag{b}$$

$$CT \leq 2.0 \tag{c}$$

$$95.0 \leq P \tag{d}$$

wherein TT represent a single plate transmittance at 25° C. and 60% RH, PT represents a parallel transmittance at 25° C. and 60% RH, CT represents a cross transmittance at 25° C. and 60% RH, and P represents a polarization degree at 25° C. and 60% RH.

6. The liquid crystal display according to claim 1, wherein the polarizing plate satisfies at least one of formulae (e) to (g):

$$T(380) \leq 2.0 \tag{e}$$

$$T(410) \leq 0.1 \tag{f}$$

$$T(700) \leq 0.5 \tag{g}$$

wherein $T(\lambda)$ represents a cross transmittance at the wavelength of $\lambda$ nm.

7. The liquid crystal display according to claim 1, wherein the polarizing plate comprises another protective film comprising at least one layer of a hard coat layer, an anti-glare layer and an anti-reflective layer.

8. The liquid crystal display according to claim 1, wherein the polarizing plate was packaged in a moisture-proofed bag, wherein the moisture-proof bag has an internal humidity of from 43% RH to 65% RH at 25° C.

9. The liquid crystal display according to claim 1, wherein the polarizing plate was packaged in a moisture-proofed bag, wherein the moisture-proof bag has a first humidity within a range of ±15% RH with respect to a second humidity when the polarizing plate is superposed on a liquid crystal cell at the second humidity.

10. The liquid crystal display according to claim 1, which contains only one cellulose acylate film.

11. The liquid crystal display according to claim 1, which further comprising a backlight, wherein the cellulose acylate film is between the liquid crystal cell and the backlight.

* * * * *